United States Patent [19]
East et al.

[11] Patent Number: 5,321,841
[45] Date of Patent: * Jun. 14, 1994

[54] SYSTEM FOR DETERMINING THE RIGHTS OF OBJECT ACCESS FOR A SERVER PROCESS BY COMBINING THEM WITH THE RIGHTS OF THE CLIENT PROCESS

[75] Inventors: Jeffrey A. East, Aptos, Calif.; James J. Walker, Redmond, Wash.; Steven M. Jenness, Redmond, Wash.; Mark C. Ozur, Redmond, Wash.; James W. Kelly, Jr., Redmond, Wash.

[73] Assignee: Digital Equipment Corporation, Maynard, Mass.

[*] Notice: The portion of the term of this patent subsequent to Feb. 16, 2010 has been disclaimed.

[21] Appl. No.: 11,293

[22] Filed: Jan. 29, 1993

Related U.S. Application Data

[63] Continuation of Ser. No. 873,359, Apr. 21, 1992, Pat. No. 5,187,790, which is a continuation of Ser. No. 373,878, Jun. 29, 1989, abandoned.

[51] Int. Cl.$^5$ ............................................. G06F 13/14
[52] U.S. Cl. ................................... 395/725; 395/650; 364/DIG. 1; 364/DIG. 2; 364/241.8; 364/246.6; 364/280; 364/280.4; 364/281.4; 364/284; 364/284.3; 364/285.4; 364/286.4; 364/286.5
[58] Field of Search ........................... 395/650, 725; 364/DIG. 1, DIG. 2

[56] References Cited

U.S. PATENT DOCUMENTS

| | | | |
|---|---|---|---|
| 4,135,240 | 1/1979 | Ritchie | 395/425 |
| 4,455,602 | 6/1984 | Baxter, III et al. | 395/775 |
| 4,525,780 | 6/1985 | Bratt et al. | 395/425 |
| 4,584,639 | 4/1986 | Hardy | 395/650 |
| 4,621,321 | 11/1986 | Boebert et al. | 395/600 |
| 4,656,579 | 4/1987 | Bachman et al. | 395/425 |
| 4,701,840 | 10/1987 | Boebert et al. | 395/800 |
| 4,713,753 | 12/1987 | Boebert et al. | 395/425 |
| 4,714,996 | 12/1987 | Gladney et al. | 395/600 |
| 4,800,488 | 1/1989 | Agrawal et al. | 395/800 |
| 4,809,160 | 2/1989 | Mahon et al. | 395/700 |
| 4,825,354 | 4/1989 | Agrawal et al. | 395/600 |
| 4,849,877 | 7/1989 | Bishop et al. | 395/650 |
| 4,901,231 | 2/1990 | Bishop et al. | 395/325 |
| 5,057,996 | 10/1991 | Cutler et al. | 395/650 |
| 5,129,083 | 7/1992 | Cutler et al. | 395/600 |
| 5,129,084 | 7/1992 | Kelly, Jr. et al. | 395/650 |
| 5,136,712 | 8/1992 | Perazzoli, Jr. et al. | 395/600 |
| 5,187,790 | 2/1993 | East et al. | 395/725 |
| 5,249,293 | 9/1993 | Schreiber et al. | 395/650 |

Primary Examiner—Thomas C. Lee
Assistant Examiner—Wayne Amsbury
Attorney, Agent, or Firm—Flehr, Hohbach, Test, Albritton & Herbert

[57] ABSTRACT

In a multitasking, multiuser computer system, a server process temporarily impersonates the characteristics of a client process when the client process preforms a remote procedure call on the server process. Each process has an identifier list with a plurality of identifiers that characterize the process. The server process generates a new identifier list which is either the same as the client process's list, or is the union of the server's and the client's lists. Each object in the system can have an access control list which defines the identifiers that a process must have in order to access the object. The operation system has access checking software for enabling a selected process access to a specified object when the identifiers for the process match the list of identifiers in the access control list of the specified object. The server can therefore access all objects accessible to the client while the server is working for the client. The server can restore its original identifier list after completing the services that it performs for the client.

8 Claims, 20 Drawing Sheets

SYSTEM FOR DETERMINING THE RIGHTS OF OBJECT ACCESS FOR A SERVER PROCESS BY COMBINING THEM WITH THE RIGHTS OF THE CLIENT PROCESS

This application is a continuation of Ser. No. 07/873,359, filed Apr. 21, 1992, now U.S. Pat. No. 5,187,790, which was a continuation of Ser. No. 07/373,878, filed Jun. 29, 1989, now abandoned.

This application is related to the application entitled RPC BASED COMPUTER SYSTEM USING TRANSPARENT CALLBACKS AND ASSOCIATED METHOD, in the name of Mark Ozur et al., Ser. No. 07/830,730, now U.S. Pat. No. 5,247,676, filed Feb. 4, 1992, which is a continuation of Ser. No. 07/374,100, now abandoned, filed on the same date as this application, and is hereby incorporated by reference.

The present invention relates generally to multitasking digital computer systems and particularly to methods and systems for managing the data structures used by a multitasking digital computer system.

BACKGROUND OF THE INVENTION

Large computer systems generally allow many users to simultaneously use a single computer's resources. Such systems are herein called multitasking digital computer systems. Such computers include virtually all mainframe computers and most minicomputers.

One of the primary jobs of the operating system for a multitasking computer system is to support and keep track of the operations of a multiplicity of users who are running numerous concurrent processes. Thus the computer's operating system must have data structures which represent the status of each user. Such status information includes the memory and other resources being used by each user process.

If every user process were completely independent, had its own dedicated resources, and there were no concerns about which resources each process could use, operating systems could be relatively simple. However, in actuality, computer resources are shared and many user processes need to access commonly used or owned resources. In fact, each user may generate a number of execution threads which run simultaneously and which need to be able to share resources and to communicate with other ones of the user's threads.

Another concern in multitasking computer systems is security and data integrity. Ideally, the computer system should provide an access security system which enables each user to control the extent or amount of sharing of information that belongs to the user. Further, the system should provide several types of protection. For example, when multiple processes are allowed access to a resource, the identity of each process which attempts to access the resource should be tested to determine if that particular process is authorized to access the resource. The system of access control should also provide limited "visibility" of computer resources so that an unauthorized user cannot obtain information about another user by repeated attempts to access resources with various names. In addition, to protect data integrity, the system must protect against simultaneous accesses by different authorized processes.

Yet another concern of multitasking operating systems is clearing the system of "objects" (i.e., files and data structures) which are no longer needed by any of the systems users. Ideally, the system should also be able to automatically deallocate resources, such as input/output devices, no longer needed by a process.

SUMMARY OF THE INVENTION

In summary, the present invention is an object based operating system for a multitasking computer system. The present invention, which is also called an object based architecture, is "object based" because it provides objects which represent the architecture or interrelationships of the system's resources. The present invention provides an extensible, yet rigorous framework for the definition and manipulation of object data structures.

Objects, generally, are data structures which store information about the user processes running in the system, and which act as gateways to using the system's resources. Resources, generally, include sets of information, physical devices such as a tape drive, and various programs or "operations". Such resources are not available to a user unless the user has explicit permission to use that resource. More specifically, access to certain objects is required in order to use the corresponding resources of the computer system.

A multiplicity of processes run concurrently in the computer system, including at least one server process and a plurality of client processes. Each process has a list of identifiers that represent the process' object access rights.

Each object has an access control list, which is list of identifiers, for use in determine which processes can access that object. Access control software in the computer's operating system compares the identifier list of a process requesting access to a specified object with the object's access control list, and allows the requested access when the process' identifier list matches at least one of the identifiers in the specified object's access control list.

For the purpose of facilitating server/client remote procedure calls, the operating system includes special software that enables a server process to "impersonate" a client process. When one of the client processes calls a server process, the impersonation software generates an adopted set of identifiers to temporarily replace the server process' usual list of identifiers. The impersonation software has two modes of operation. In one mode, the adopted set of identifiers is generated by replacing the server process' list of identifiers with the list of identifiers of the requesting client process. In the second mode, the adopted set of identifiers is generated by replacing said server process' list of identifiers with the union of the requesting client process' identifiers and the server process' list of identifiers.

After receiving the adopted set of identifiers, the server process performs tasks on behalf of the requesting client process, including accessing various objects using the adopted set of identifiers generated by said impersonation software.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
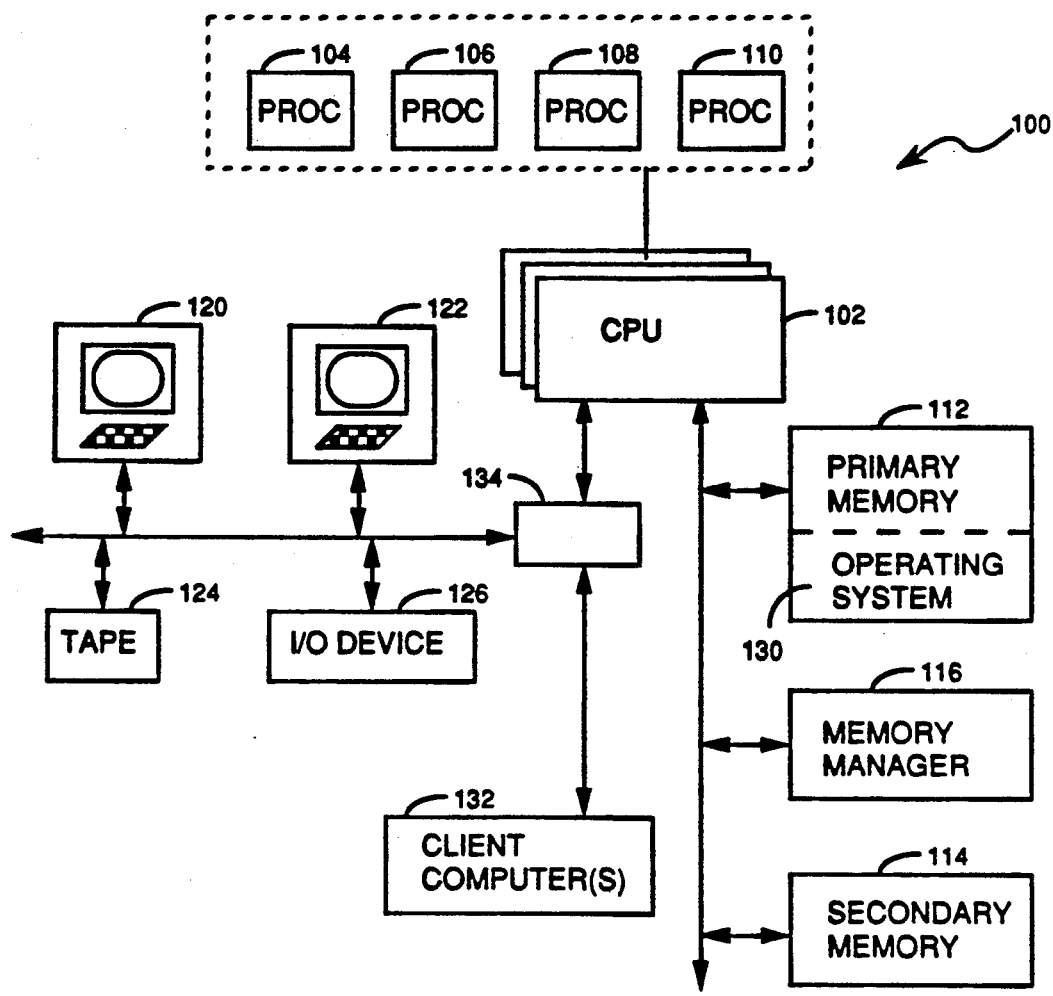
FIG. 1 is a block diagram of a computer with a multitasking operating system.

Referring to FIG. 1, a computer system 100 in accordance with the present invention includes a high speed central processing unit (CPU) 102 which concurrently runs several processes 104–110. The CPU 102 may be either a single powerful processor or may contain multiple processors. As is standard in multitasking computer systems, each process has its own virtual memory space which is mapped partially into high speed primary memory 112 and partially into lower speed secondary memory 114 by a virtual memory manager 116. More generally, each process 104–110 is allocated a certain portion of computer's resources, including selected peripheral devices such as terminals 120–122 and other input/output devices 124 and 126. Other types of resources which are allocated to selected ones of the processes include specified sets of data and data structures in the system's memory 112–114.

The set of software which controls the computer's operation and the allocation of resources to the processes 104–110 running the computer is called the operating system 130. For the purposes of the present discussion it can be assumed that the operating system 130 is resident in primary memory 112, although certain infrequently used portions of the operating system may be swapped out to secondary memory by the memory manager 116. One feature of the present invention is that the computer system 100 can serve as a "computer server" to one or more client computers 132. Client computers 132, coupled to the CPU 102 by a bus interface 134, can send tasks to the computer system 100 for execution. The computer system 100 is a mainframe or other high performance computer system which can execute tasks in a relatively short period of time compared to the client computers 132. The operating system 130 of the present invention includes a mechanism for setting up a process in the computer system 100 which adopts the "profile" or characteristics of the process in the client computer which is being served.

Figure 2:
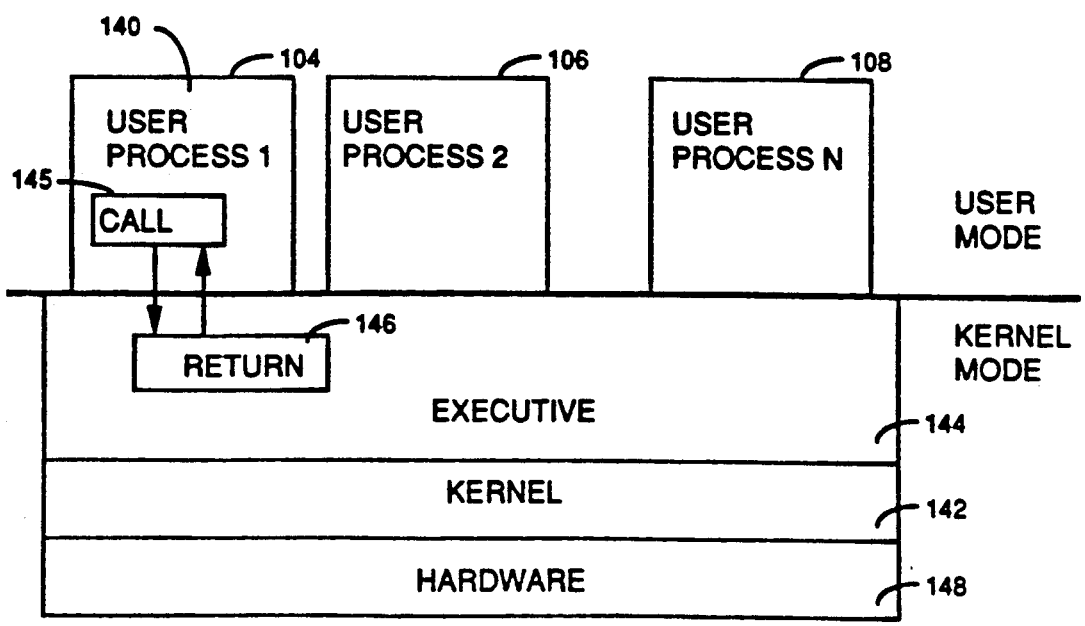
FIG. 2 is a block diagram of the virtual memory spaces of several concurrently running user processes.

Referring to FIG. 2, there is shown a block diagram of the virtual memory spaces of several concurrently running user processes 104–108. The virtual memory space of every process includes a portion 140 which can be accessed by "user mode" programs as well as "kernel mode" programs, and a portion 142–144 which can be accessed only by "kernel mode" programs. The kernel mode portion 142–144 includes two sets of software called "the kernel" 142 and "the executive" 144.

As shown in FIG. 2, the portion of the virtual memory space which comprises the kernel mode portion 142–144 is common to all user processes running in the computer system. In other words, a predefined portion of the address space of every user process is occupied by the operating system 130 and its data structures. The user mode portion of each user process 140 occupies a distinct virtual memory space.

"Kernel mode" is a mode of operation used only by kernel and executive software routines. Only kernel mode routines can access the data structures used to control the operation of the computer system and to define the system resources allocated to each user process.

When a user mode program 145 in a user process 104 creates an object, or performs any one of a number of operations on an object, the user process calls a kernel mode routine 146 in the kernel mode portion 142–144 of its address space to perform the necessary operations. When the kernel mode routine 146 completes the necessary operations on the kernel mode data structures, it returns control to the user mode program 145.

The kernel 142 is the "lowest layers, of the operating system 130 which interacts most directly with the computer's hardware 148. The kernel 142 synchronizes various activities, implements multiprocessing capabilities, dispatches execution threads, and provides services to device drivers for handling interrupts.

The executive 144, which also runs in kernel mode, implements system services, memory management, user-level object support, the computer's file system, network access, and device drivers. The executive defines "system policy", such as the rules which govern the visibility of user accessible objects.

OBJECT ARCHITECTURE

The object architecture of the present invention is a set of data structures and procedures which controls the use of user definable objects.

GLOSSARY

To clarify the following discussion, the following definitions are provided.

"Objects" are data structures used to hold information that is used by the operating system and which must be protected from unauthorized access by users of the system. While users cannot themselves "define" objects, they can ask the operating system to create specified objects on their behalf. The resultant objects are system data structures that are accessible by the user through system routines which protect the integrity of those objects. For instance, a "process object" is a type of object used in the present invention to store the information needed by the operating system to keep track of the status of a particular user process. "User accessible objects" are objects used by user processes, and will be referred to herein simply as "objects."

"Kernel objects" are a distinct set of data abstractions used by the system's kernel and are called kernel objects in order to distinguish them from the regular objects which are part of the object architecture of the present invention.

A "user" is herein defined to mean a person or other entity recognized by the computer system as being authorized to create processes and to use resources in the computer system.

A "Job" represents the current set of system resources being used by a particular user.

A "Process" is the entity to which a virtual memory address space is assigned, and is the entity to which process-level objects are assigned. There can be multiple processes in a Job. Whenever a job is created, a "top level" process is created for that job. Any process, including the top level process,, can cause the creation of additional processes, called subprocesses or child processes. Any process which creates another process is referred to as a parent process.

A "thread", also called an "execution thread", is the entity which actually executes programs and thus provides a stream of execution (sometimes called a context state). It is the schedulable entity which executes program steps and consumes resources. More technically, a thread is a system defined object that executes a program that is resident in a process's address space. A thread contains a machine state that consists of the computer's register contents, a program counter, and other privileged information needed to cause the thread to execute a program. Each process many create a number of execution threads which run "simultaneously" and which can share resources and communicate with one another. Multiple threads can run simultaneously when multiple CPUs are available. On a single CPU system the operating system makes the threads appear to run simultaneously. All resource limitation data structures for a thread belong to the thread's process.

An "object container" is a data structure for storing pointers to objects. It is essentially a table which is used to keep track of a set of objects.

A "container directory" is a data structure for storing pointers to a set of object containers. Thus a container directory is a table used to keep track of a set of object containers.

OBJECT HIERARCHY

Figure 3:
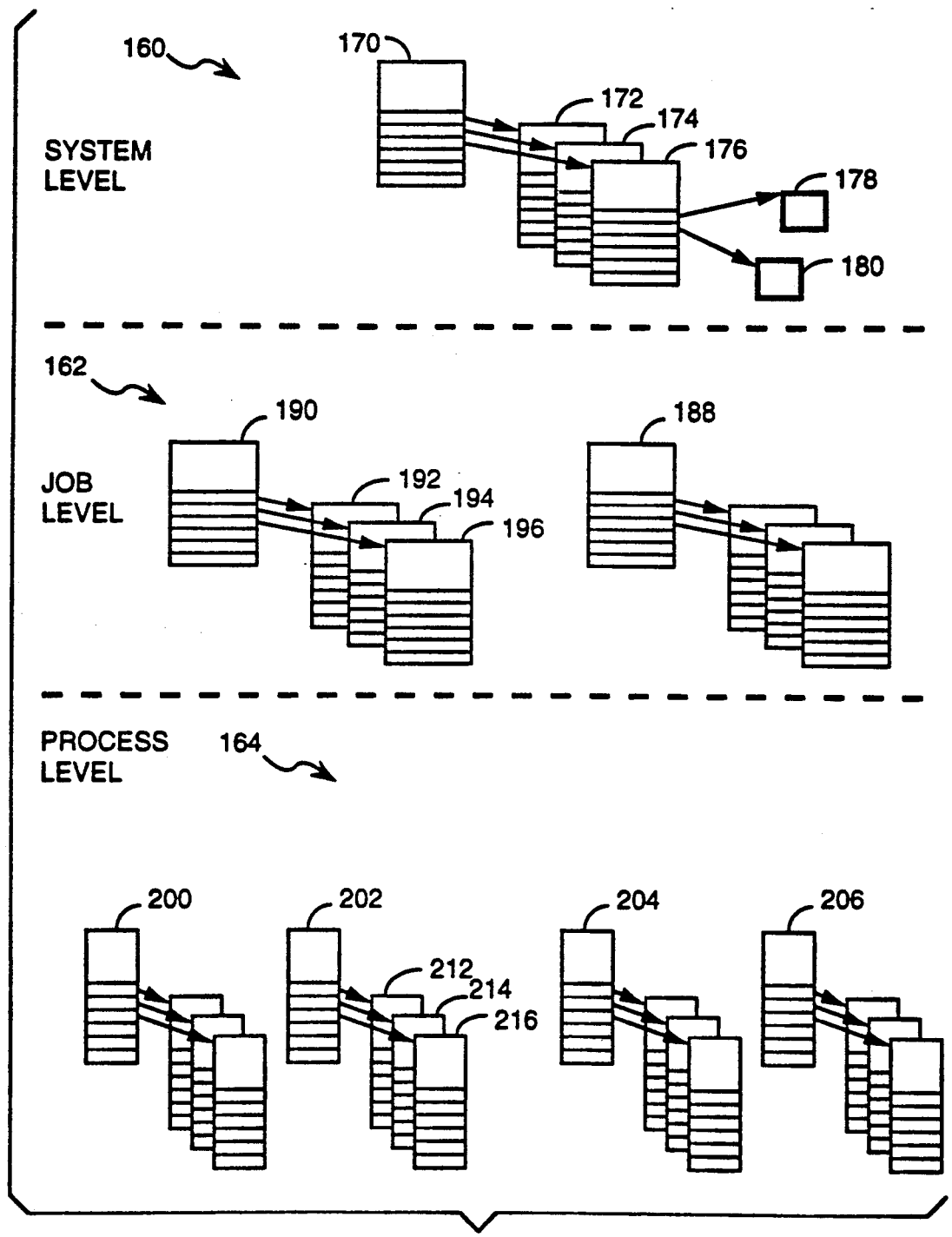
FIG. 3 is a block diagram showing how data structure objects in the system are organized in a three level hierarchy.

Referring to FIG. 3, the object architecture of the present invention provides a hierarchical "visibility structure" for objects. When an object is "visible" to a particular execution thread or process it means that the execution thread may at least attempt to access that object. Objects not visible to a process are stored in such a way that the process cannot even attempt access.

When an object is created, it is placed at one of three levels: the system level 160, the job level 162, or the process level 164. At the system level 160 there is a single container directory 170 which contains a set of system level object containers 172, 174, 176. Objects 178-180 in system level containers are visible to all threads on the system.

At the job level 162 there is a container directory 190 for every job that is currently active in the system. Each job level container directory 190 contains a set of job level object containers 192, 194, 196. Objects at the job level 162 are visible only to threads in that job.

At the process level 164 there is a container directory 200-206 for every process that is currently active in the system. Each process level container directory 200 contains a set of process level object containers 212, 214, 216. Objects at the process level 164 are visible only to threads in that process. For example, a thread cannot access an object that is at the process level for another process. As will be explained below, this visibility restriction is achieved by giving each process a pointer, called an object ID, only to its own process level container directory. Because a process cannot have a pointer to the process level container directory for other processes, each process is incapable of "expressing" the object ID of objects in the containers not visible to that process.

Each process is assigned at least two process level object containers 212 and 214. The first object container 212 is called the public display container for the process and the second container 214 is called the private container. Only objects that the process wants to be accessible to subprocesses are placed in the public display container 214, and all other objects created by the process are put in its private container 216.

Figure 4:
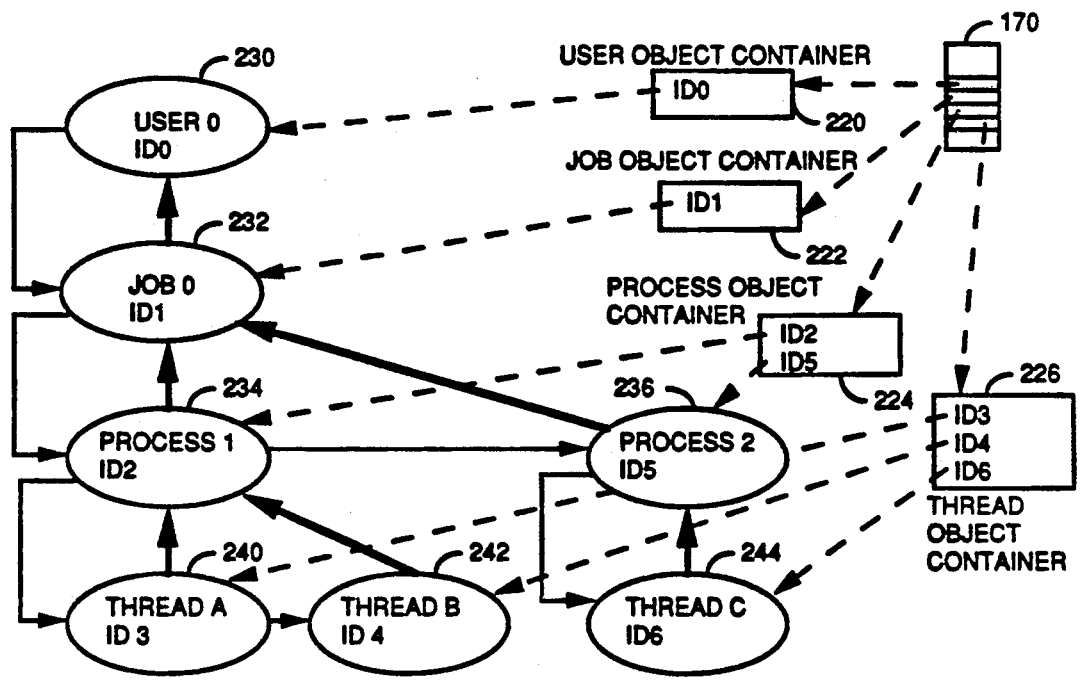
FIG. 4 is a block diagram showing the hierarchical relationship between a user object, a job, the processes for a job, and the execution threads for a process.

Referring to FIG. 4, there is a hierarchy of objects which represents users, jobs, processes and threads. FIG. 4 shows the hierarchical relationship between the objects for a user, a job, the processes for a job, and the execution threads for a process.

As shown, there are four levels of objects in the User-Job-Process-Thread (UJPT) hierarchy, and each type of object is stored in a corresponding system level object container 220, 222, 224 and 226. All user objects 230 are stored in a user object container 220. Job objects 232 are stored in a job object container 222. Process objects 234 and 236 are stored in a process object container 224, and thread objects 240, 242 and 244 are stored in a thread object container 226.

The four levels of objects provide a logical grouping of functionality and control. A user object 230, which appears at the highest level of the User-Job-Process-Thread (UJPT) hierarchy, defines the security profile and resource quotas/limits for its underlying objects. The user object 230 also stores a pointer to the job object 232 for the user.

A job object 232 provides a job level container directory and a set of resource limits for a collection of processes running as a job. The job object 232 includes a reference pointer to its user object 230, and a list head which points to the first process object 234 for the job. Thus the process objects 234-236 for a particular job are accessed as a linked list. Note that in FIG. 4, linked list pointers are depicted as narrow lines with arrow heads which point either down or to the right within the hierarchy, while reference pointers are depicted as thicker lines with arrow heads that point upwards in the hierarchy.

A process object 234 provides a process level container directory, a pointer to the page table for the process, and pointers to the parameters needed to manage the address spaces of its execution threads. The process object 234 includes a reference pointer to its job object 232, and a list head which points to first thread object 240 for the process. The thread objects 240-242 for a particular process are accessed as a linked list. The process object 234 also contains a list head which points to the first subprocess for which the object 234 is the parent process (not shown in FIG. 4).

A thread object 240 contains a thread control block which stores the processor state as it executes the steps of a program, including the pointers and values needed to keep track of all resources used by the thread object. The thread object 240 includes a reference pointer to its process object 234, and a list pointer for joining additional thread objects into a linked list of threads for the process.

Figure 5:
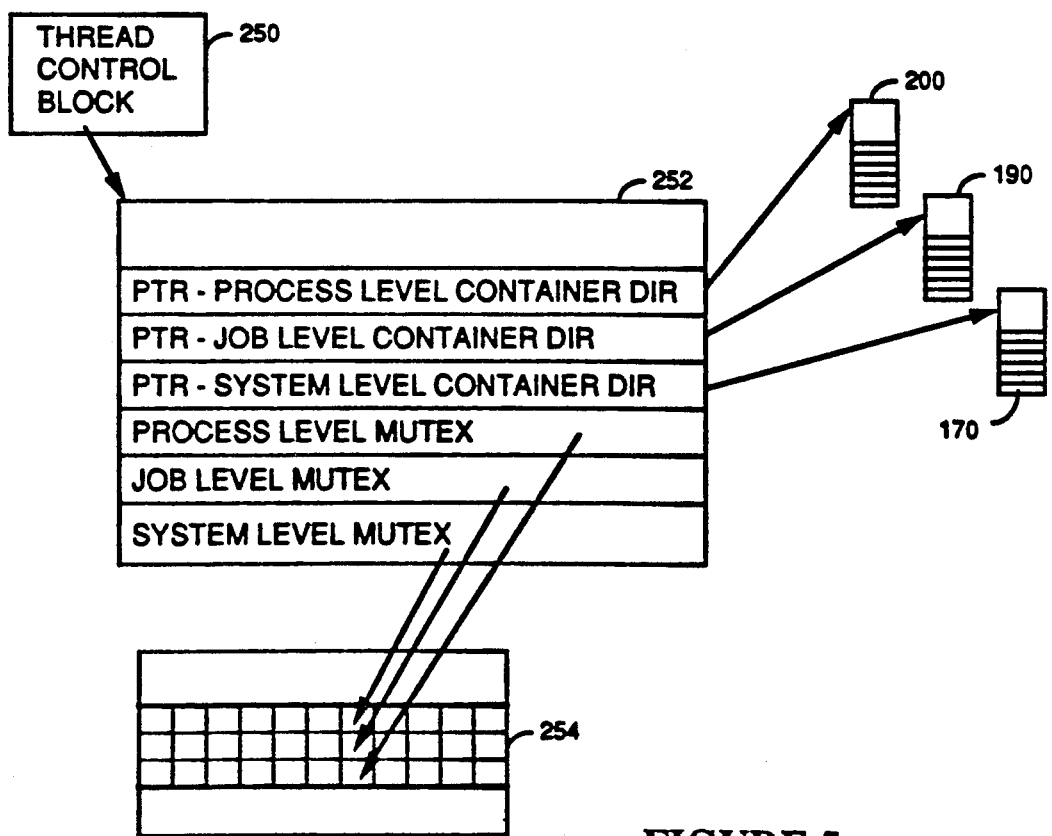
FIG. 5 is a block diagram showing the range of objects visible to a particular execution thread.

FIG. 5 is a block diagram showing the range of objects visible to a particular execution thread. In particular, each thread object contains a thread control block 250 which points to the software process control block 252 for the thread's process. The software process control block 252 contains pointers which indirectly point to a container directory at each of three visibility levels. The container directory 170 at the process level is the container directory belonging to the process object for the thread. Similarly, the container directory 190 at the job level is the container directory belonging to the job object for the thread. The system level container directory 200 is the same for all threads.

MUTEXES

Access to each and every container directory is governed by a corresponding mutex. A mutex is essentially a flag used to synchronize access to a corresponding system resource. The purpose of a mutex is to ensure that only one thread accesses a particular resource at any one time. To use a resource that is protected by a mutex, one must first "obtain the mutex". obtaining a mutex is an atomic (i.e., uninterruptable and interlocked) operation in which the mutex is tested. If the mutex was previously set, the process trying to obtain the mutex is suspended until the mutex becomes free. If the mutex is free, it is set and the requesting process is then allowed to access the protected resource.

Mutexes are used throughout the present invention to synchronize access to container directories, object containers, linked lists of objects, and many other types of data structures. For instance, to change certain fields of an object, the thread making the change must first obtain the mutex for the container in which the object is located. In addition, many objects contain a mutex which protects that object.

All mutexes used by the system are stored in an array 254 in a non-paged, protected portion of primary memory, accessible only to kernel mode routines, which cannot be swapped out by the memory manager. The "mutexes" shown in many of the data structures in the Figures are actually pointers to the corresponding mutexes in the mutex array 254. In other embodiments the mutexes need not be stored in an array so long as they are stored in non-paged, protected memory.

As will be explained in more detail below, in the section entitled waitable Objects, mutexes are a special type of kernel synchronization primitive.

As shown in FIG. 5, there is a mutex for each of the three container directories which are visible to a particular thread.

CONTAINER DATA STRUCTURES

Figure 6:
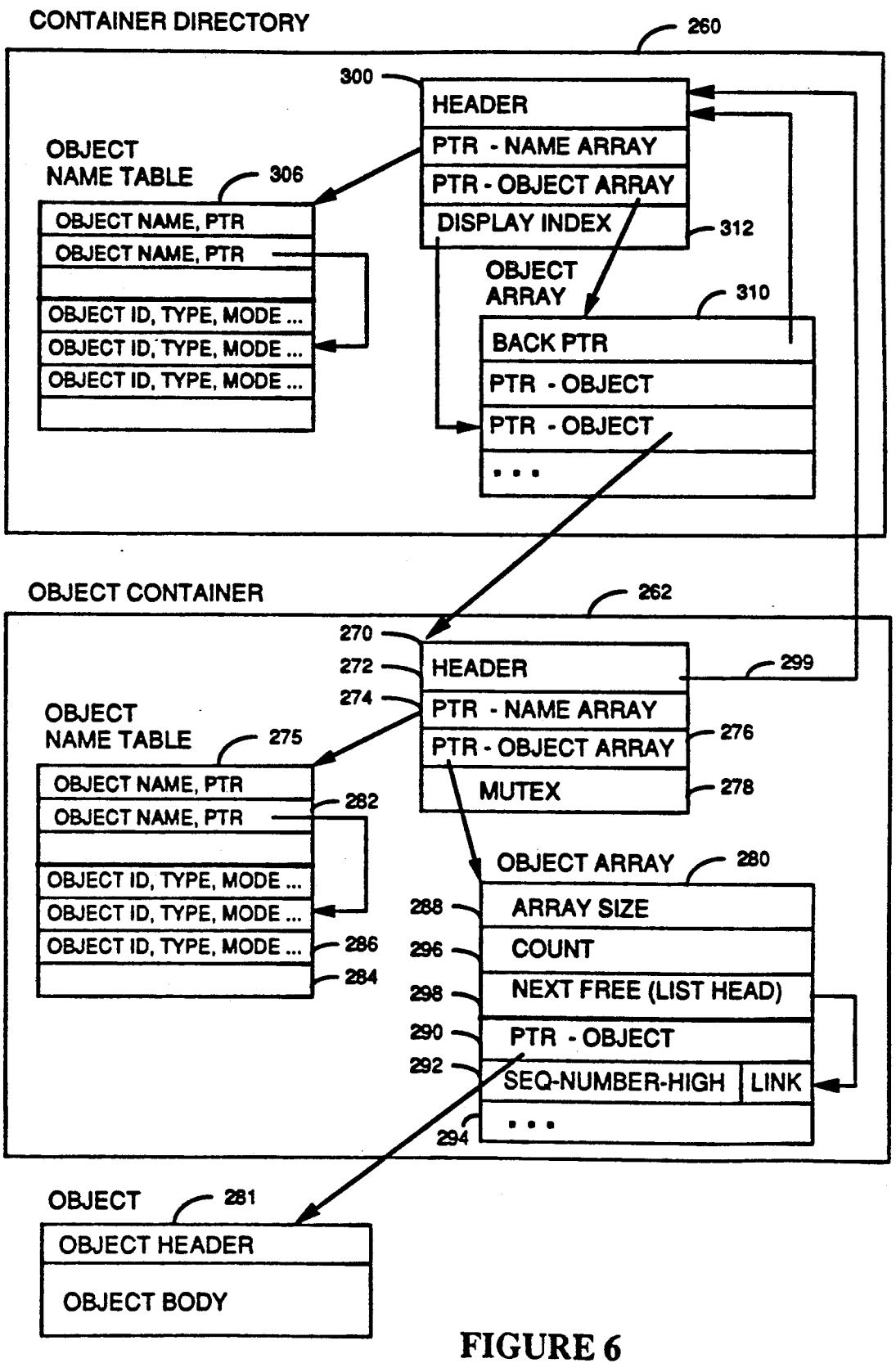
FIG. 6 is a block diagram of the container directory and object container data structures at one level of the three level hierarchy shown in FIG. 3.

Referring to FIG. 6, there is shown a portion of the data structures for one container directory 260 and one object container 262. For the purposes of this discussion, the container directory and object container data structures may be at any level of the three level hierarchy shown in FIG. 3.

The data structures for container directories and object containers are virtually identical. For the sake of clarity, the data structure for an object container will be explained first.

An object container 262 comprises a container object 270, which contains a standard header 272, a pointer 274 to a name table 275, and a pointer 276 to an object array 280. The purpose of the name table 275 is to translate object names into object IDs, and the purpose of the object array 280 is to translate object IDs into pointers to objects 281. The object container also includes a container mutex 278 which is used to synchronize access to certain fields in the name table 275, the object array 280, and the objects in the container.

The name table 275 has two portions, an object name array 282 and an array of name definition blocks 284. The object name array 282 is simply an index into the array 284 of name definition blocks and may be implemented as either a hash table or a binary tree. In either case, each entry in the name array 282 contains one object name and one pointer to an entry in the array of name definition blocks 284. Each name definition block 286 contains information for one object name, including the object ID as well as the object's type (object types are described in more detail below) and mode (i.e., accessible by user mode or kernel mode routines).

The object array 280 contains an array size value 288 which denotes the size of the array 280, which corresponds to the maximum number of object points that can be stored in the object array 280. The object array has a set of elements 290-294, each of which can store either an object pointer or a place holder for an object pointer. The count value field 296 denotes the number of elements in the object array which currently hold object pointers (i.e., the count value is equal to the number of object pointers currently stored in the object array 280).

Array elements such as element 292 which store a place holder are said to be "free". These unused elements are arranged in a singly linked "free list", the head of which is the "next free" link head field 298. The unused elements 292 in the object array contain a "sequence number high" field and a link to the next free element in the object array. The link fields in the unused elements form a list of unused object array elements. As will be described below with respect to FIGS. 7 and 8, the "sequence number high" value is used when an object pointer is stored in this element. See the discussion of the sequence number high field 340 of an object ID, below.

Whenever a new object pointer is stored in the object array 280, the element at the top of the free list (pointed to by the link head 298) is popped off the top of the free list and is used to store the new object pointer. The count field 296 is also incremented. When an object pointer is deleted, it is added to the top of the free list and the count field 296 is decremented.

The header of every object, including a object container object 270, contains a back pointer to the container in which it resides. The container which holds an object container is a container directory 260, and therefore the object container's back pointer 299 points to its container directory 260. The back pointer in the object header of a container directory object (not shown) points to itself.

A container directory 260 comprises a container directory object 300, which has the same basic data structure as an object container 262. However, the object names in the name table 306 of a container directory 260 are the names of object containers. In other words, the objects referenced by the name table 306 and the object array 310 in a container directory are object containers, whereas many different types of objects can be referenced by the name table 275 and object array 280 of an object container 262. Note that every object, including container directories, must have at least one object ID and one corresponding pointer in a container. Since there is no "container for container directories", the first entry in the object array 310 of an object container is a pointer to itself.

The container directory object 300 contains an additional pointer called the display index 311. For system and job level container directories, the display index simply points at the first item in the object array 310.

For process level containers, the top entries in the object array point to the publicly accessible object containers visible to the process, herein called display containers, and the next entry points to the private container for the process. As mentioned above with reference to FIG. 3, each process is assigned at least two process level object containers 212 and 214. The first object container 212 is called the public display container for the process and the second container 214 is called the private container. Only objects that the process wants to be accessible to subprocesses are placed in the public display container 212, and all other objects created by the process are put in its private container 214 or other private object containers.

Figure 6A:
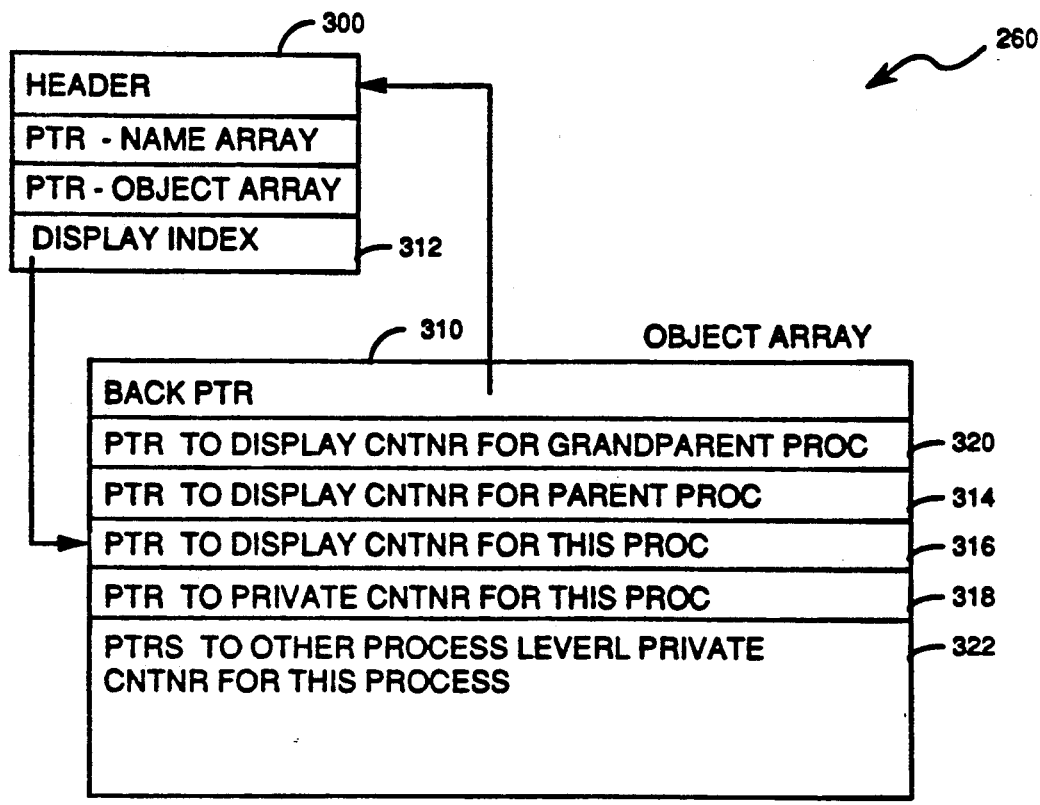
FIG. 6A is a more detailed diagram of the process level container directory for a process.

Referring to FIG. 6A, there is shown a more detailed diagram of the process level container directory 260 for a process. Whenever a subprocess is created, it is automatically given a pointer 314 to its parent's public display container as well as a pointer 316 to its own public display container and a pointer 318 to its private display container. As shown in FIG. 6A, the display index 312 points to the entry 316 in the object array which points to the public display container for this process. If this process is a subprocess, above the public display entry 316 are pointers 314 and 320 which point to the 1/2 display containers for this process's parent process and grandparent process, and so on. Below the entry 318 for the process's private container, the container directory 260 may contain pointers 322 to other process level private containers for this process.

OBJECT DATA STRUCTURE

Figure 7:
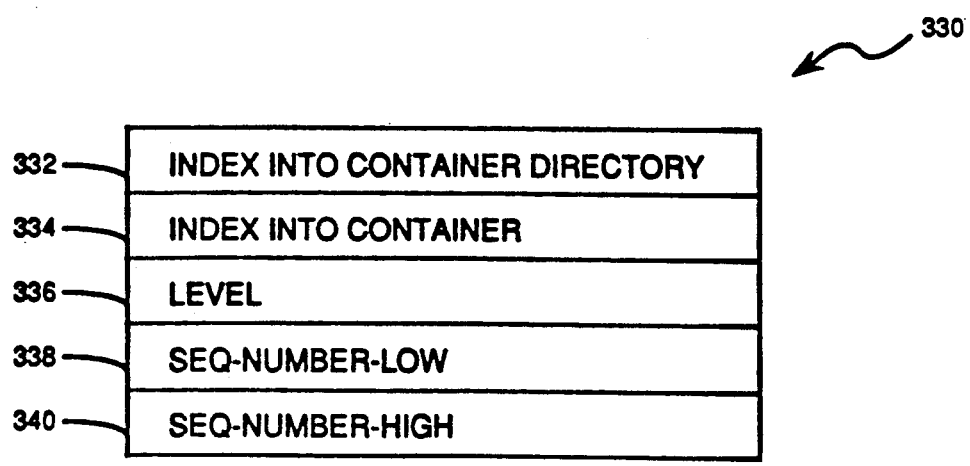
FIG. 7 is a block diagram of an object ID.

Referring to FIG. 7, when an object is created, it is assigned a 64-bit value called its object ID 330. This value provides the fastest means for a user-mode routine to identify and access the object. Only kernel mode routines can use pointers which directly address an object.

When an object is created, the "object ID" returned by the object creating routine is called the principal ID. Every object has only one principal ID. An object may also have one or more reference IDs which also point indirectly to the object. Reference IDS are discussed below in the section entitled Reference IDs.

Both the principal ID and reference IDs are herein called "object IDs". In addition, it should be noted that these IDs are not "capabilities" as that term is used when describing capability based operating systems—rather they are indirect pointers to data structures called objects.

The principal ID of an object that is accessible by two processes is the same in both processes. This extends to objects at all levels. This property allows IDs of shared objects to be communicated between cooperating threads.

Object IDs are used to uniquely identify objects within the system. It should be noted that an object ID is not the address of an object; it is a value which may be translated into the address of an object through the use of the object array in an object container as shown in FIG. 6. Thus object IDs only indirectly point to objects.

Referring to FIGS. 6 and 7, the fields of an object ID 330 are as follows. An index into a container directory 332 is used to index into the object array 310 of a container directory 260 and thereby find a pointer to the object container 262. An index into a container's object array 334 is used to index into the object array 280 of an object container and thereby find a pointer to the object.

The level 336 of the principal object ID determines the level of an object's visibility: process, job or system, as was discussed with reference to FIG. 3. To find the container directory for an object ID, one may refer to the software process control block 252 (see FIG. 5). Any process which can express the object ID for an object can try to access the object. As shown in FIG. 5, the software control block 252 contains a pointer to the container directory corresponding to each level of visibility.

The sequence number low 338 and sequence number high 340 are used to prevent a program from using an object ID after the corresponding object has been deleted, and other types of programming errors. The sequence number low field 338 is a ten bit value which receives a new randomly generated value each time that a new object is created. The sequence number high field 340 is a ten bit value inside each object ID that is incremented each time that an object is created, and reset to zero when it overflows.

Note that the elements 290-294 in the object container are reused after an object is deleted. When an object pointer is deleted from the object array 280 in a container, the sequence number high 340 for the corresponding object ID is stored in the element that formerly held the deleted object pointer. The value of the sequence number high is incremented and stored in an object ID (and in the header of an object, as will be explained below) the next time that this element of the object array is used to store a pointer to a newly created object.

The use of sequence numbers does not totally eliminate the problem of illegal references to deleted objects, it just reduces it to an extremely small probability for most programming situations.

Figure 8:
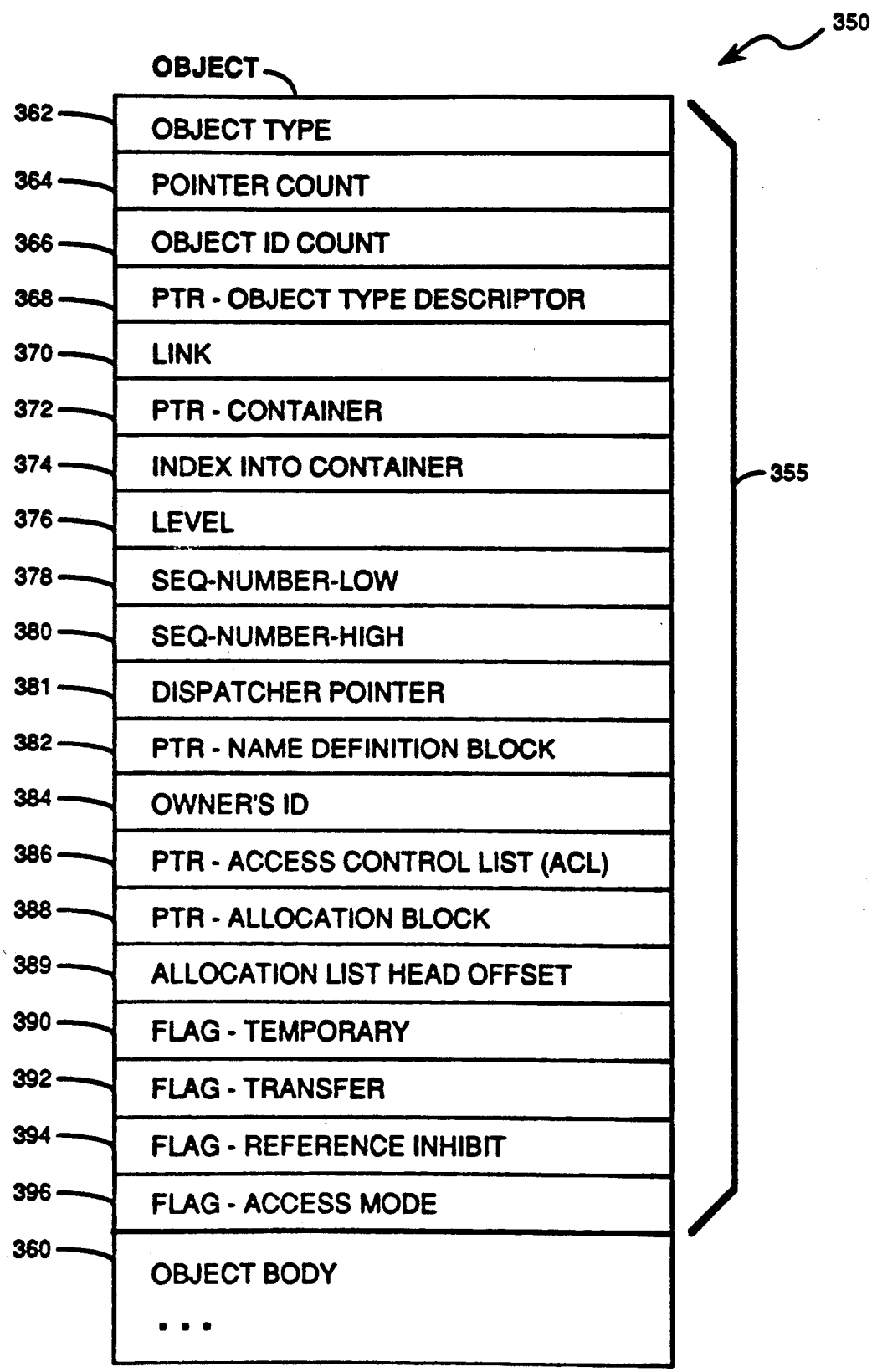
FIG. 8 is a block diagram of the data structure of an object.

Referring to FIG. 8, each object 350 in the preferred embodiment has two parts, a standard object header 355 which is only manipulated by kernel mode object architecture routines, and an object type specific body 360 which is manipulated by object specific service routines. The object header 350 of each object is a data structure that has a number of fields 362-396. The object type 362 identifies the type of the object. The PTR-Object Type Descriptor field 368 contains a pointer to an object type descriptor (OTD) for this particular object type. OTDs will be discussed below with reference to FIG. 9.

In a typical implementation of the present invention there will be at least twenty-five different types of objects, including container directories, object containers, user definition objects, job definition objects, process control blocks, thread control blocks, and many others. For each object type there is an object type descriptor 400, described below with reference to FIG. 9, which specifies the routines for handling, allocating and deleting objects of that type. When an object ID is translated into a pointer to an object header, the type field 362 in the object header is compared with the desired object type to make sure that the proper object is being accessed.

For all objects except container objects, the object ID count 366 represents the number of object IDs which refer to the object. For container objects, the object ID count 366 represents the number of container directory object array pointers which refer to the object, which is also the number of container directories that can refer to this object container. Note that for container objects the object ID itself is not counted. Hence, for object containers, the object ID count 366 is equal to one unless the container is a display container for a parent process (see FIG. 6A and the corresponding discussion, above).

The object ID count 366 signifies the number of reasons that an object should not be removed from the system. If the object ID count 366 is zero, then no object container has a pointer to that object's header 355.

The object ID count field 336 is never directly incremented or decremented by a user mode routine, only the executive routines for object support operate on this field 366. For a kernel mode routine to increment or decrement this field 366, the mutex field 278 (in FIG. 6) of the object container in which this object resides and directory-level mutex must first be acquired. This is necessary to ensure that an object cannot be deleted while another reference to the object is being established. As will be explained below, it is sometimes necessary to acquire several mutexes before performing an operation on an object to ensure the integrity the object.

Whenever an access to an object will span a period of time that can not be protected by use of mutex locks on appropriate data structures, the pointer count field 364 must be incremented. In particular, an address of an object may not be used to regain access to the object unless the pointer count 364 has been previously incremented.

The pointer count 364 represents the number of pointers that have been taken out on the object, plus one for a non-zero object ID count. When an object ID is translated by an object service routine, the pointer count 364 is incremented by one. The pointer count 364 for an object signifies the number of reasons the storage for an object should not be deallocated. To increment this field, the directory-level mutex must first be held. This is necessary to avoid race conditions with the object ID being deleted.

When an object ID, object container pointer, or reference object ID is deleted, the object ID count 366 of the object is decremented. If the resultant object ID count is zero, the pointer count 364 is decremented, and then the process of deleting the object is begun by calling an object type-specific remove routine to initiate any required object type-specific removal actions, such as canceling I/O.

As mentioned above, when the object ID count 366 is decremented to zero, this causes the pointer count 364 to be decremented, as does the dereferencing of a pointer. When the pointer count 364 reaches zero, the object type-specific delete routine is called, and the object's storage is deallocated (i.e., the object is deleted).

One of the major goals of the lock strategy for objects is to allow the pointer count 364 to be decremented without having to hold a lock (i.e., mutex) to do so. This allows low overhead dereferencing of objects on such operations as I/O, wait, and the deleting of a reference object. Note that the pointer count 364 should be non-zero whenever the object ID count 366 is non-zero.

The link field 370 contains a forward pointer to the next object header of this type, as well as a backward link to the previous object header of this type. Thus all objects of each type are linked into a doubly linked list. The list head resides in the OTD for the object type, as will be shown in FIG. 9.

The container pointer 372 is a pointer to the object container in which the object resides. This field, also called the object's back pointer, is dynamic in that the object may be transferred to a different object container. Such a transfer would result in the assignment of a new object ID to the object. This field is zeroed when the principal object ID is deleted. This field 372 may be accessed only by a thread holding both the directory-level mutex and the mutex 278 (shown in FIG. 6) within the object container.

The index into container field 374 is the index into the object array in the container for this object.

The level field 376 specifies the level of visibility of the object, and the level of the object container in which the object resides.

When an object ID is translated into the address of an object, the value of the object ID's sequence fields 338 and 340 (see FIG. 7) are compared to the values of the sequence fields 378 and 380 in the object header. If they are not identical, then the object ID in invalid (i.e., the object referenced by the object ID has been deleted and the corresponding object ID entry in the object container has been reused).

The sequence number fields 378 and 380 of an object may be accessed only by a process which holds both the directory-level mutex and the mutex within the object container.

Note that it is possible to construct the principal object ID for an object if one is given the object header. The level field 376 is equal to the level field 336 in the object's principal ID, and the sequence number fields 378-380 are equal to those in all of the object's ID. The container index field 374 of the object header is equal to the container index field 334 of the object's principal ID. Finally, the container directory index field 332 of the object ID is constructed as follows. The container pointer field 372 points to the object header of a container. The index field 374 in that container's object header is equal to the directory index 332 for the principal object ID.

A dispatcher pointer 381 in the object header is given a nil value if the object is not a waitable object, as will be explained in more detail in the section entitled Waitable Objects. If the object is a waitable object, the dispatcher pointer 381 points to a data structure for a "kernel synchronization primitive" that is stored in the object body 360.

The pointer 382 to a name definition block is used to associate a name string with an object. If the object has an associated name, this field 382 contains a pointer to a name definition block which contains the name. Otherwise this field has a value of zero. The directory level mutex, the object container mutex, and the type-specific mutex must all be acquired in order to modify this field 382.

The owner's ID field 384 identifies the owner of the object. This field is used by the security access validation rules, which are discussed below in the section entitled Access Control Lists.

The ACL pointer field 386 points to an access control list (ACL) f or the object. A nil value indicates that no ACL exists for the object. The format and use of the ACL are discussed below in the section entitled Access Control Lists.

The allocation block pointer 388 is a used by object ID translation routines to ensure that the thread which is trying to access the object has access to the object. In order to translate an object ID into a pointer to an object header, the requesting thread must have access to the object as determined by the ACL, and must be in the allocation class of the object. Object allocation and allocation classes are discussed below in the section entitled Object Allocation.

The Allocation List Head Offset parameter 389 is non-negative when the object 350 has other objects allocated to it. The Allocation List Head Offset 389 indicates the position in the object body 360 of a list head which points to a list of allocation blocks for the objects allocated to this object.

Several binary flags 390-396 govern use of the object. When the temporary flag 390 is set it indicates that the object is temporary. If an object is temporary, the object is automatically deleted when all reference IDs to it are deleted. Note this is different from ordinary object deletion, which occurs when both the object ID count 366 and the pointer count 364 are equal to zero. Therefore, when the object ID count is decremented to one, the temporary flag field 390 must be checked. This will be explained in more detail in the section entitled Reference Object IDs and Temporary Objects.

The transfer flag 392, when clear, indicates that the object cannot be transferred to another container. The transfer action field state is determined at the time the object is created.

The reference inhibit flag 394, when true, prevents the creation of reference IDs to this object.

The access mode flag 396 contains the owner mode (kernel or user) of the object. Kernel-mode objects may not be created in user owned containers. Mode is also used to verify access to the object by the access validation procedures described below in the section entitled Access Control Lists.

OBJECT TYPE DESCRIPTOR (OTD)

Figure 9:
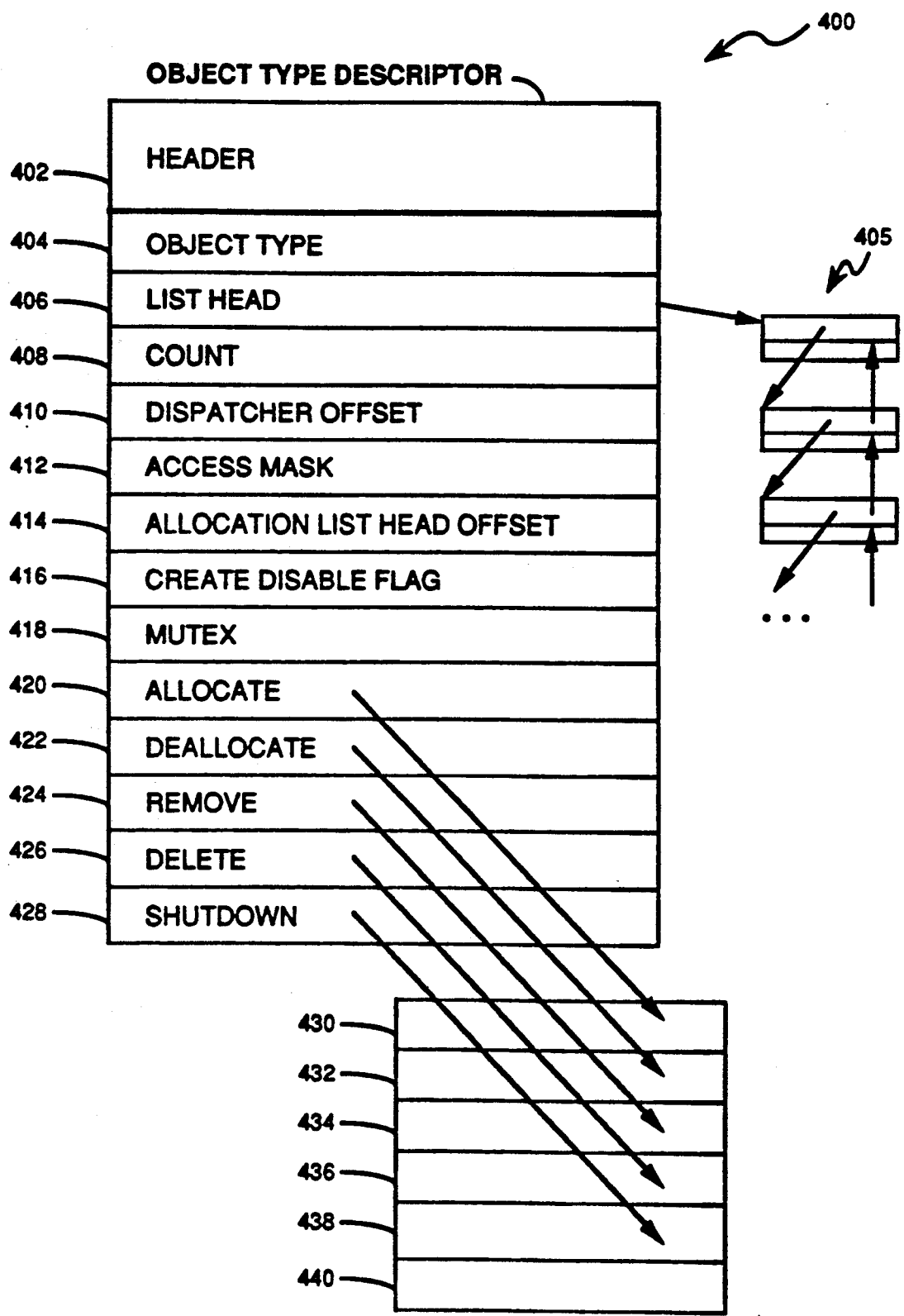
FIG. 9 is a block diagram an object type descriptor.

Referring to FIG. 9, there is a single object type descriptor (OTD) for each object type defined by the system. OTDs are objects, and all OTD objects reside in a single system level container.

OTD objects have a standard object header 402 and an object body which contains general information about an object type, not a particular instance of an object. For example, on OTD indicates whether an object type supports synchronization or wait operations. Anything an OTD specifies about an object type applies to all instances of that object type.

Part of the information in an OTD 400 is the location of a number of routines 430-438 that may be called by the executive 144 (see FIG. 2). These routines have standard definitions across all object types, but require object type-specific processing. The routines are located by the executive via standard offsets into the OTD, at which are located pointers 420-428 to these routines.

Users of object instances of a particular type do not need to know anything about the routines 430-438 pointed to by the OTD. Only the designer of an object type must know how these routines work. Thus, the present invention makes it relatively easy to introduce new object types into a system because standard types of operations which depend on the particular structure of a new object type, such as creating, allocating and deleting the object, are defined by the designer of the object type and thus the details of the object's structure do not concern the users of these objects.

All the fields 404-428 of the OTD's body have a standardized definition. This allows the executive 144 to use the information in an OTD without having any detailed knowledge of the corresponding object type.

The Object Type field 404 contains a value indicating the type of object the OTD represents.

The List Head field 406 is a list head for a doubly linked list 405 of all the object instances of this type. The List Head field 406 contains a forward link to the first object header of this type, and a backward link to the last object header of this type. These links are used for consistency checking within the object architecture.

The Count field 408 contains a count of the number of objects of the corresponding type that currently exist in the system.

The Dispatcher Offset 410 is used only for object types which support wait operations. When non-negative, the Dispatcher Offset 410 is the offset from the start of the object body to a "kernel synchronization primitive" which is located inside the object body for object instances of this type. The Dispatcher Offset 410 is used to compute a pointer to the kernel synchronization primitive, called the Dispatcher Pointer, that is stored in each object's header.

When a wait operation is to be performed on an object instance of this type, the system's executive 144 issues a kernel wait operation on the kernel synchronization primitive pointed to by the object's Dispatcher Pointer. Kernel synchronization objects are discussed in more detail below in the section entitled Waitable Objects.

Any object type which has a non-negative dispatcher field must allocate the object instances of this type from non-paged portions of the system's primary memory because the kernel synchronization object must be in non-paged memory.

The Access Mask 412 is a bit mask which is used in conjunction with access control lists, and is discussed in section below entitled Access Control Lists.

The Allocation List Head Offset 414 is used only for object types that may have objects allocated to it. For example, thread objects, process objects, job objects and user objects can have other objects allocated to them. When the Allocation List Head Offset 414 is non-negative, it is the offset from the start of the object body to a list head which points to a set of allocation blocks. Object allocation and allocation blocks are discussed in more detail in the section entitled Object Allocation.

The Create Disable Flag 416, when set, prevents additional objects of this type from being created. It is used as part of process of shutting the system down in an orderly fashion.

The OTD Mutex 418 provides synchronization for creation, deletion and state changes among objects of this type.

The Allocate field 420 points to an allocation procedure 430 which performs object type-specific procedures when an object of this type is allocated to a user or process. Object allocation is discussed below in the section entitled Object Allocation. A null routine is provided for use by object types which do not have an allocate procedure.

The Deallocate field 422 points to a deallocation procedure 432 which performs object type-specific procedures when an object of this type is deallocated from a user or process.

The Remove field 424 points to a remove procedure 434. The remove procedure 434 for each object type performs any necessary actions that must be performed before deleting an object. The remove procedure is called when all object IDs to the object have been deleted. This procedure 434 allows object type-specific processing to be performed after applications can no longer reference the object instance, but before the object instance is actually deleted. A null procedure is provided for use by object types which do not have a remove procedure.

The Delete field 426 points to a delete procedure 436, which is responsible for manipulating object type-dependent data structures and deallocating the storage allocated for the object's extensions. The delete procedure is called when an object's pointer count 364 is decremented to zero. Note that the pointer counter 364 cannot decrement to zero when the object ID count is non-zero. After the delete procedure 436 is run, an object deletion routine in the kernel deallocates the storage for the object's header and body. A null procedure is provided for use by object types which do not have a delete procedure.

The Shutdown field 428 points to a shutdown procedure 438. The shutdown procedure 438 is called once when an object type is permanently removed from the system, generally at system shutdown time. The purpose of this routine is to perform object type-specific shutdown operations. Among other things, this provides the opportunity to dump any statistics that may have been gathered relating to the object type.

Although not referenced in the OTD 400, there is a distinct object creation routine 440 for each object type, herein called CREATE_XXXX where XXXX identifies the object type. The create routine 440 creates new instances of the object type, allocates space for the object body and its extensions, and also stores initial values and data structures in the object body.

Table 1 is a list of some of the object types used in the preferred embodiment and which are discussed in this specification.

TABLE 1

| OBJECT TYPES |
| --- |
| Container Directory |
| Object Container |
| User |
| Job |
| Process |
| Thread |
| Object Type Descriptor (OTD) |
| Privileged Operation Object |
| FPU - Function Processor Unit (device unit) |
| Notification Object **Waitable Objects |
| Synchronization Object |
| Semaphore Object |
| Timer Object |

CREATING NEW OBJECT TYPES

Except for a few object types used by the object architecture itself, such as object containers, all object types are defined within the system by calling a service routine to create an object type-specific object Type Descriptor (OTD), the format of which is shown in FIG. 9. This service routine is called Create OTD. The OTD for each object type contains information that allows the system to interact with object type-specific routines in a standard fashion.

Figure 10:
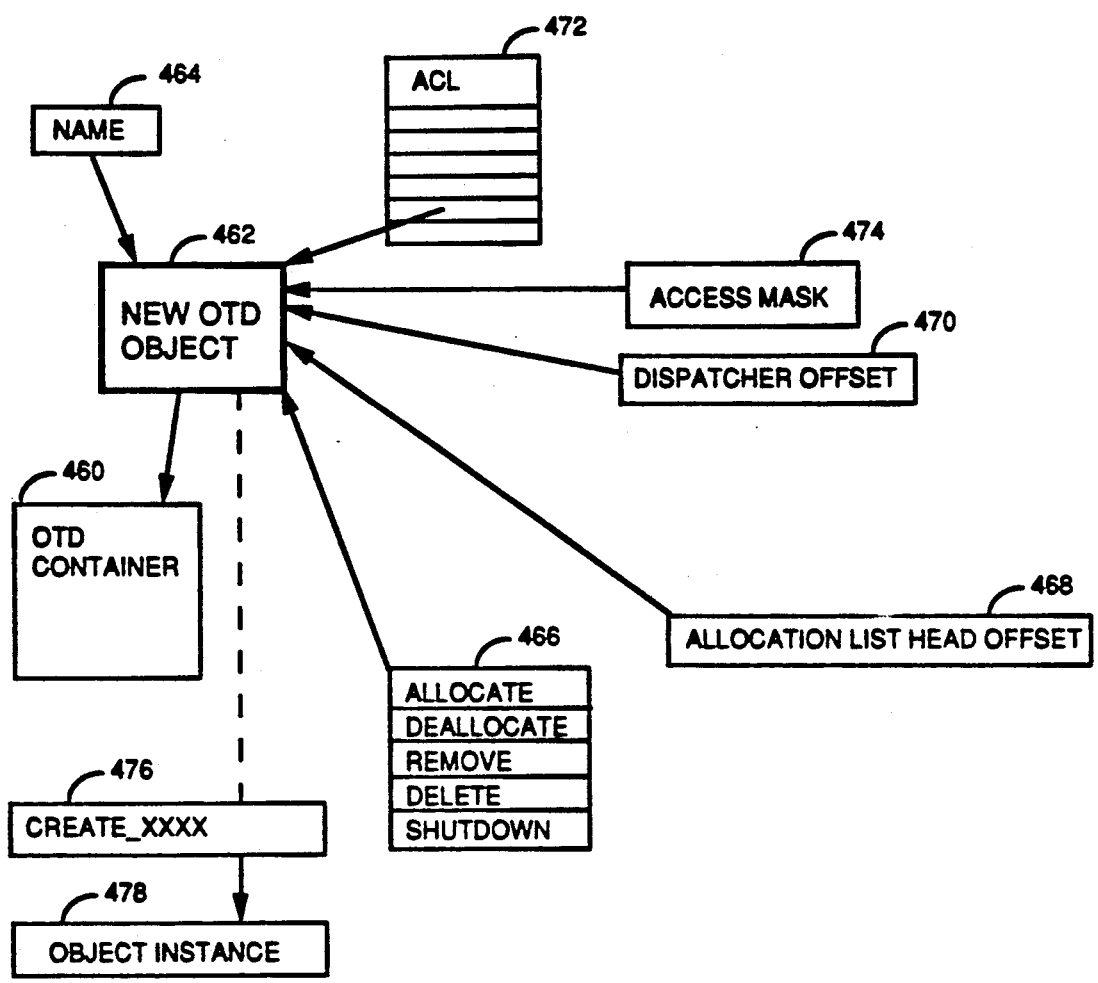
FIG. 10 is a block diagram of the process for adding a new object type to the system by creating an object type descriptor for the new object type.

It is a feature of the present invention that there is a simple procedure for defining new types of objects and a corresponding set of object type-specific routines for interacting with the system. Referring to FIG. 10, all OTDs are objects stored in a system level container 460 called the OTD Container. When a new OTD 462 is created, it is added to the list of defined OTDs—i.e., it is added to the OTDs in the OTD Container 460 and is linked to the list of OTDs by the Link field 370 (shown in FIG. 8) in the headers of the OTDS. This provides the framework for operating system-to-object type interactions. It also provides a standardized location for keeping object type-specific control information. For example, a count field 408 (shown in FIG. 9) in each OTD contains a count of the instances of the related object type.

To create a new OTD 462, the caller must provide the following items. A name 464 must be provided for the new object type, which is stored in the name array of the OTD container 460. The caller must also provide a set of routines 466 for allocating, deallocating, removing, and deleting objects of this object type, and for handling objects of this type during system shutdown. A non-negative allocation list head offset 468 is provided if the new object type is to be an object type to which other objects can be allocated. A non-negative dispatcher offset 470 is provided if the new object type is to be a waitable object.

An access control list 472 may optionally be provided if use of the new object type is to be restricted to a defined set of authorized users. Additionally, an access mask 474 must be provided to indicate the types of allowed access to objects of this type.

A special routine 476 must be provided for creating objects of the new object type. This routine is generally named Create__XXXX where "XXXX" is the name of the object type. The create object routine 476 uses information in the OTD 462 to allocate the space needed for new object instances and to create new object instances 478 of this type. The create object routine 476 and the other system interface routines 466 are the primary routines which must have detailed knowledge of the internal data structure of object instances of this object type.

REFERENCE OBJECT IDS AND TEMPORARY OBJECTS

When an object has an outstanding pointer to it, its data structures cannot be deleted. There are two methods of preventing an object from being deleted: one for kernel mode routines and one for user mode routines. The executive 144 (which operates in kernel mode) can increment the pointer count field 364 when a routine is repeatedly accessing an object to prevent the object from being deleted. A user-mode program can prevent an object from being deleted by creating a reference ID to the object ID.

Figure 11:
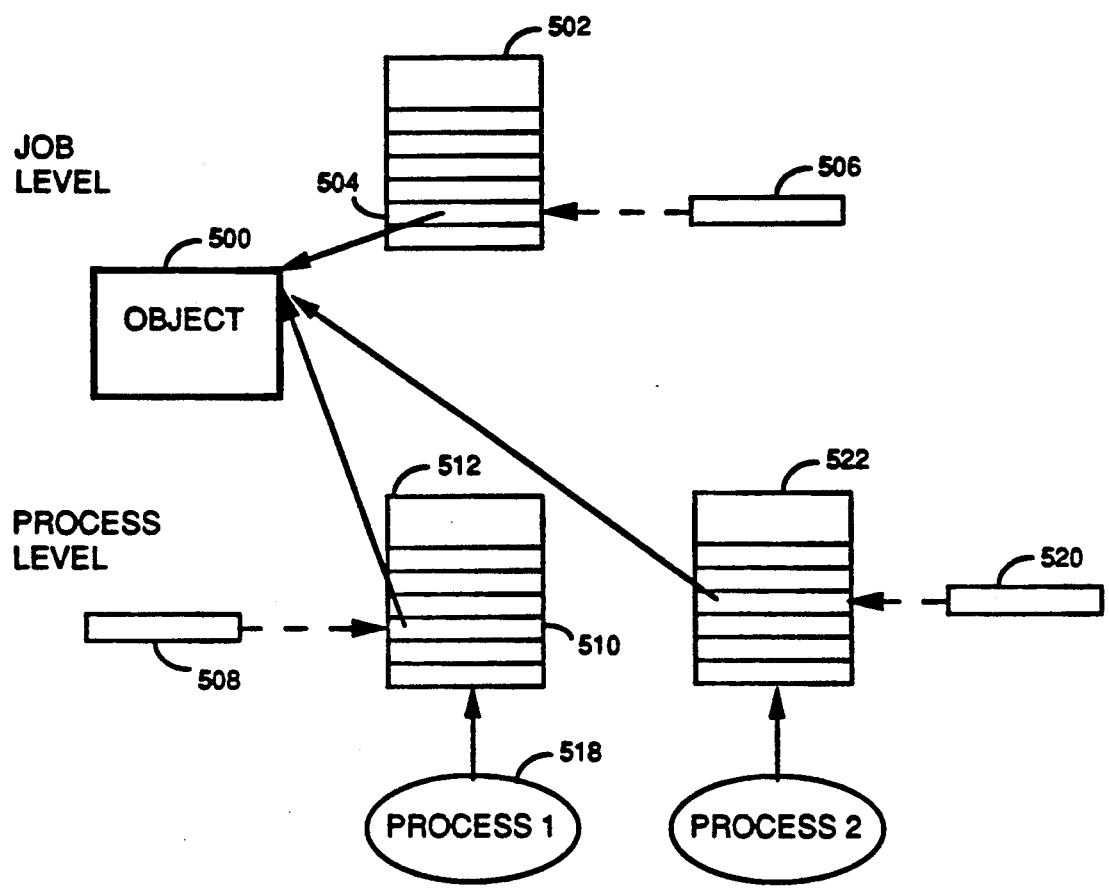
FIG. 11 is a block diagram showing the reference pointers for a specified object.

Referring to FIG. 11, there is shown an object 500 and a job level container 502 in which a pointer 504 to the object is stored. The object 500 has a principal object ID 506 which indirectly references the object 500 by way of the object pointer 504. Creating a reference ID 508 creates another object ID for the object 500 which indirectly points to the object 500 via a pointer 510 in another container 512.

When a reference ID is created for an object, the object ID count 366 (see FIG. 8) in the object's header is incremented but the pointer count 364 is not. This ensures that object ID count will not be decremented to zero, and that the object's storage cannot be deleted until the reference object ID is deleted.

The visibility of an object when it is created is the visibility of the object container in which it is inserted. The visibility of an object identified by a reference ID is the visibility of the object container specified when the reference ID is created.

The level of the target container 512 specified when creating a new reference ID 508 must be less visible than the container in which the object resides (i.e., the container corresponding to the principal object ID 506). Additional reference IDs 520 can be created using other target containers 522. In general, a process 518 will usually generate only one reference ID for an object. Therefore each reference ID for an object is usually created using a different container, and in a container different from the container holding the object.

One reason for the constraint that reference IDs must be created using a less visible container than the source container is that creating a reference ID cannot be used as a method of increasing the visibility of an object. The only way to increase the visibility of an object is to move the object to a more visible container. In general, only the owner of an object has the authority to move the object to a more visible container.

Another reason for the constraint that reference IDs must be created using a different container than the source container is the system must be able to differentiate between reference and principal IDs. Both the reference IDs and the principal ID for the same object translate into a pointer to the same object header.

CREATING REFERENCE IDs

Figure 12:
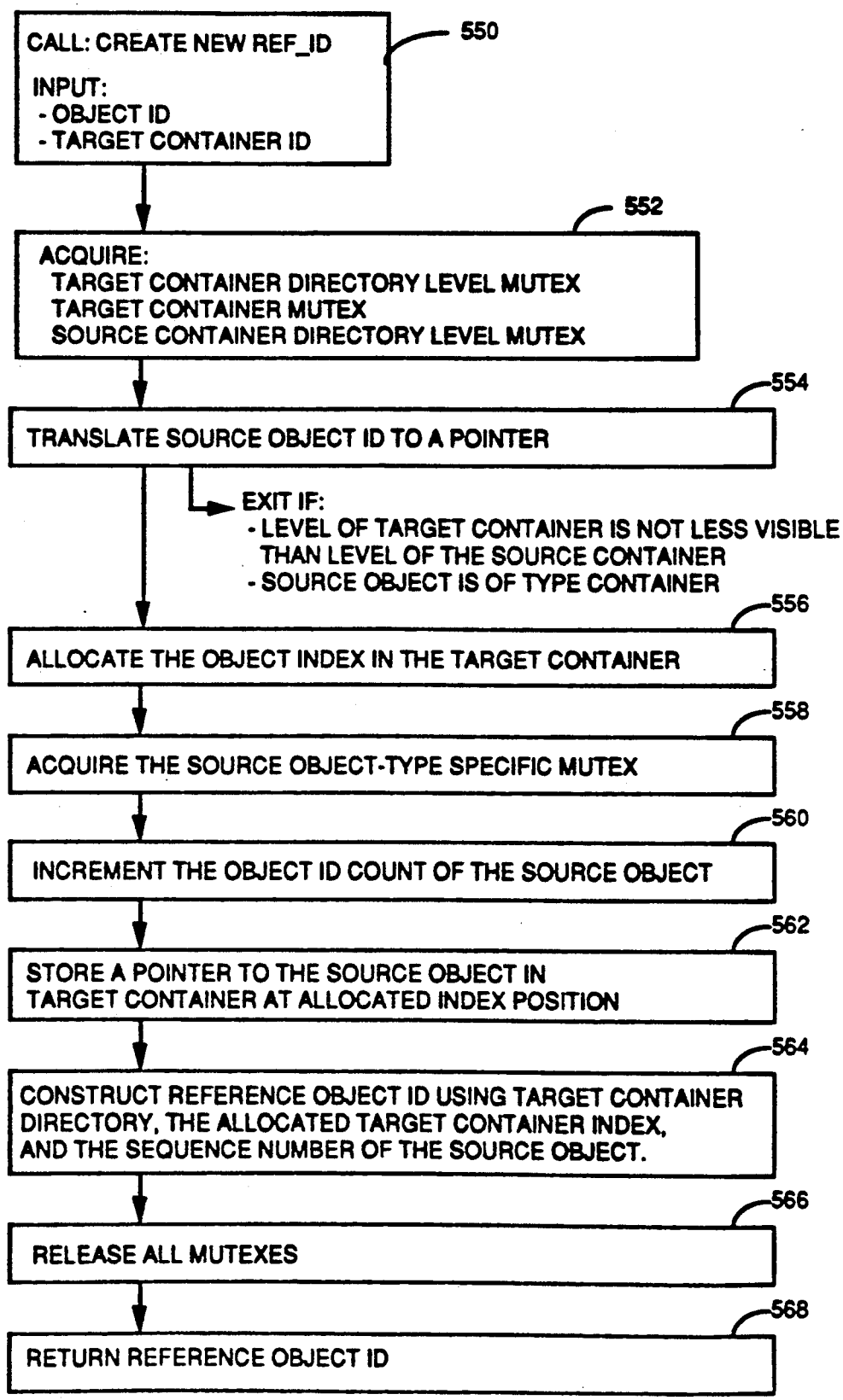
FIG. 12 is a flow chart of the process for creating a reference ID for a specified object.

Referring to FIG. 12, there is shown a flow chart of the process for creating reference IDs. The process starts when a thread calls the routine and provides as inputs an object ID for an object and a target container ID that determines the visibility of the object identified by the new object ID (box 550).

The new reference ID creation routine then acquires the mutexes for the target container directory, the target container, and the source container directory (box 552). Note that the "source container" is the container that holds the object for which a reference ID is being created.

Next, the source (input) object ID is translated into a pointer to the object (box 554). At this point the routine aborts if the level of the target container is not less visible than the level of the source container, or if the source object is an object container or container directory.

Then an element in the object array of the target container is allocated for storing a pointer to the source object (box 556).

The source object's type specific mutex, referenced by the corresponding OTD, is acquired (box 558) for incrementing the object ID count in the source object's header (box 560). Then a pointer to the source object is stored in the target container at the allocated index position (box 562).

A reference ID (in the format shown in FIG. 7) is constructed using the target container directory, the allocated target container index, and the sequence number of the source object (box 564). At this point all the acquired mutexes are released (box 566) and the new reference ID is returned 568 to the thread (i.e., user program) which called the create reference ID service routine.

TEMPORARY OBJECTS

Marking an object as temporary is used to cause an object to be deleted when all of its reference IDs are deleted. This is particularly useful when several processes or threads share the use of an object because no one process or thread is required to be responsible for deleting the object (i.e., its principal ID) when all the processes are done using the object. Thus when an object is marked as temporary it is given a temporary lifetime which expires when all users of the object are done with it, as signified by the deletion of all reference IDs for the object.

Note that ordinary objects are deleted only when both the object ID count 366 and the pointer count 364 for the object are equal to zero. Thus the principal ID of a non-temporary object must be explicitly deleted before the object will be deleted.

When marking an object as temporary, if the object has no reference IDs, then the object's principal ID and the object itself are deleted immediately. The only objects that can be marked as temporary reside at the job or system levels because only objects at the job and system levels can have reference IDs.

An object is marked as temporary by acquiring the mutexes for the object's container directory and container, and the object type-specific mutex, and then setting the temporary flag 390 (see FIG. 8) in the object's header. A thread can mark an object as temporary only if it has Delete Access to the object (see below discussion entitled Access Control Lists).

An object can also be made temporary by moving it to an object container at a more visible level and marking the moved object as temporary. See the discussion below entitled Moving An Object To A New Container. A new principal object ID is created for the object to denote its new level, container directory and container. The original principal object ID becomes a reference object ID, thereby ensuring that the temporary object has at least one reference ID.

DELETING OBJECT IDs

Figure 13:
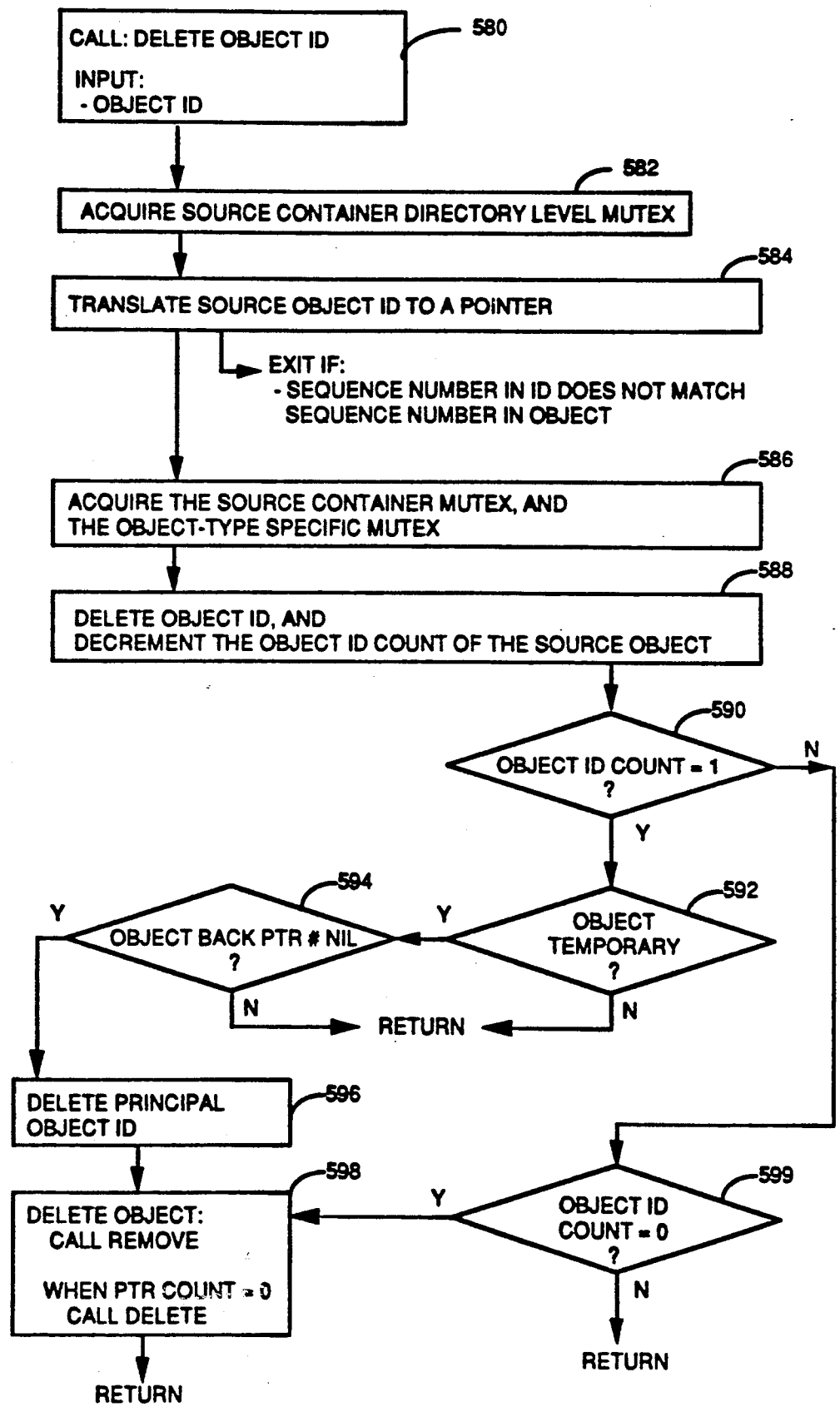
FIG. 13 is a f low chart of the process for deleting an object ID.

Referring to FIG. 13, there is shown a flow chart of the routine for deleting reference IDs and object IDs and for automatically deleting objects when there are no remaining pointers to those objects. This routine also handles the deletion of temporary objects—which are objects in which the temporary flag 390 (see FIG. 8) in the object header is set.

The only input to the object ID deletion routine is the object ID to be deleted (box 580). The routine acquires the mutex for the container directory at the level specified in the object ID (box 582), and translates the object ID into a pointer to the object (box 584). If the object ID's sequence number does not match the sequence number of the object, the object ID is invalid and the routine exits.

Next, the object's container mutex and the object type-specific mutex are acquired (box 586) so that the object ID can be deleted and the object ID count of the object can be decremented (box 588). If the resulting object ID count is equal to one (box 590), the routine checks to see if this is a temporary object (box 592). If not, the routine exits. If the object is a temporary object, one further test must be performed before the object can be deleted.

Note that the principal object ID of an object can be deleted while one or more reference IDs are outstanding. A temporary object is only deleted when all of its reference IDs have been deleted. When the principal object ID of an object is deleted, the container pointer 372 in the object's header, which is also called the back pointer is reset to nil. Therefore the way to test to see if the principal object ID has been deleted to is see if the back pointer in the object header is set to nil. If so, the object will be deleted only when the object ID count is decremented to zero.

Therefore, after determining that the object ID count is equal to one and the object is a temporary object (boxes 590 and 592), the object ID deletion routine checks to see if the object's back pointer is not equal to nil (box 594). If the back pointer is equal to nil, the principal object ID was deleted and there is a reference ID still outstanding. Therefore the object cannot be deleted and the routine exits.

If the object's back pointer is not equal to nil, there are no remaining reference IDs. Therefore the principal object ID for the object is deleted (box 596) and then object is deleted (box 598). Object deletion is done in two stages. First the remove routine for the object type is called to perform any object type-specific actions required to prepare the object for deletion. Then, when the object's pointer count reaches a value of zero, the delete routine for the object type is called to deallocate the object's storage.

If the object's pointer count is not equal to zero, the object will be deleted as soon as the object is dereferenced by the routines which hold pointers to it, which will cause the pointer count to be decremented.

If the object ID count was not equal to one (box 590), the routine checks to see if the object ID count is equal to zero (box 599). If so, object deletion proceeds as discussed above (box 598). If the object ID count is not equal to zero, the routine exits, having deleted the object ID and decremented the object's ID count.

It should be noted that the remove routine for the object is called when the object ID count reaches 0, and that the delete routine is called when both the pointer count and the object ID count reach zero. Also the remove routine is called before the delete routine. See the above discussion of the remove and delete routines in the section entitled object Type Descriptor.

MOVING AN OBJECT TO A NEW CONTAINER

In computer applications it is often desirable to share or hand-off access to the abstractions represented by objects. In the context of the present invention, sharing access to an object generally requires moving an object from its current object container to another object container. For example, an object can be transferred from a job level object container to a system level object container. This would make the object accessible throughout the system instead of just within a job. A object may also be transferred from a process level container to a job level container, or from a process private container to a process display container.

As described above with reference to FIG. 8, the object header of each object instance has a transfer flag 392. The transfer flag 392, when clear, indicates that the object cannot be transferred to another container. In addition, objects with a non-zero number of reference IDs cannot be transferred to a new container.

When an object is transferred to a new container a new object ID is created for the object using a new container, the object's name is transferred to the new container, and the current object ID is deleted.

Figure 14:
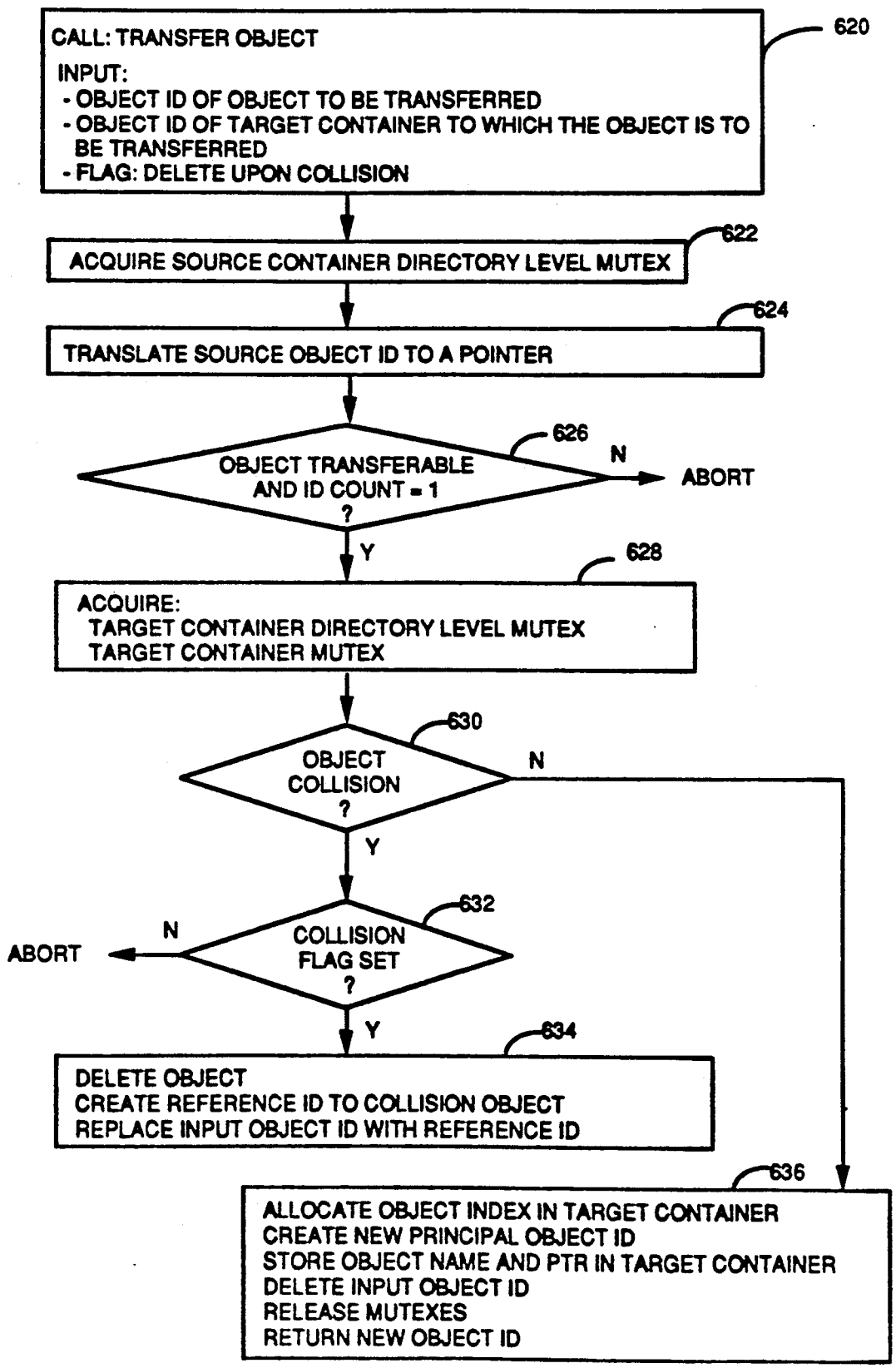
FIG. 14 is a flow chart of the process for transferring an object from one object container to another object container.

Referring to FIG. 14, there is shown a flow chart of the routine for moving an object to a specified container. The input parameters (box 620) to the routine are the object ID of the object to be transferred, the object ID of the target container to which the object is to be transferred, and a "delete upon collision flag", the purpose of which will be explained below.

The routine begins by acquiring the mutex for the current container directory level of the object (box 622) and translating the specified object ID into a pointer to the object (box 624). Then the object's transfer flag is tested and the ID count is checked to make sure it is equal to 1 (box 626). If the transfer flag is clear, or the ID couht is not equal to 1, the specified object cannot be transferred and the routine aborts. Otherwise, the routine continues by obtaining the mutexes for the target container directory level and the target container (box 628).

Next, the routine checks for a collision (box 630). A collision situation exists when an object of the same type and name as the specified object exists in the target container. If the "delete upon collision flag" is clear and a collision occurs (box 632), the routine aborts. When the "delete upon collision flag" is set, the original object is deleted and the routine returns the object ID of the duplicate object in the target container (box 634).

If a collision does not occur (box 630), an object index is allocated in the target container, a new principal object ID is created for the object, the object's name and a pointer to the object are stored in the target container, the source (input) object ID is deleted, the mutexes are released, and the routine returns the new object ID to the caller (box 636).

As noted above, an object can be made temporary when it is moved to a more visible container. The reason for making such objects temporary is that in many situations no one process can take responsibility for deleting an object. By providing temporary objects, the present invention provides a mechanism for automatically deleting such objects when no process retains a reference ID to the object. The routine for moving an object to a more visible container and making an object temporary is basically the same as the move object routine shown in FIG. 14, except that (1) the object is marked as temporary, and (2) instead of deleting the original object ID, the routine replaces it with a reference ID so that the temporary object will not be deleted immediately.

TRANSFERRING AN OBJECT CONTAINER

In systems using the present invention, a large portion of a program's context is contained in object instances. By being able to transfer object instances from a creating program to a created program, a new program's context can be passed to a newly created process. The object containers always present for a process are a job level object container, a process level private container, and a process level display container (i.e., a container which is automatically accessible to subprocesses created by this process).

When creating a new job, it is possible to transfer entire object containers of object instances to be used for any or all of the object containers used by the job. When creating a process, it is possible to transfer an entire object container of object instances to be used as the initial process private object container, or the process display container, or both. In either case, when object containers are transferred in this fashion, they become inaccessible to the creator of the new job or process because the new container is generally not in the visibility range of the creator process.

When transferring an object container of object instances in this fashion, the object containers provided by the creating program are called the source object containers. The object instances contained in the source object containers are called source object instances.

Figure 15:
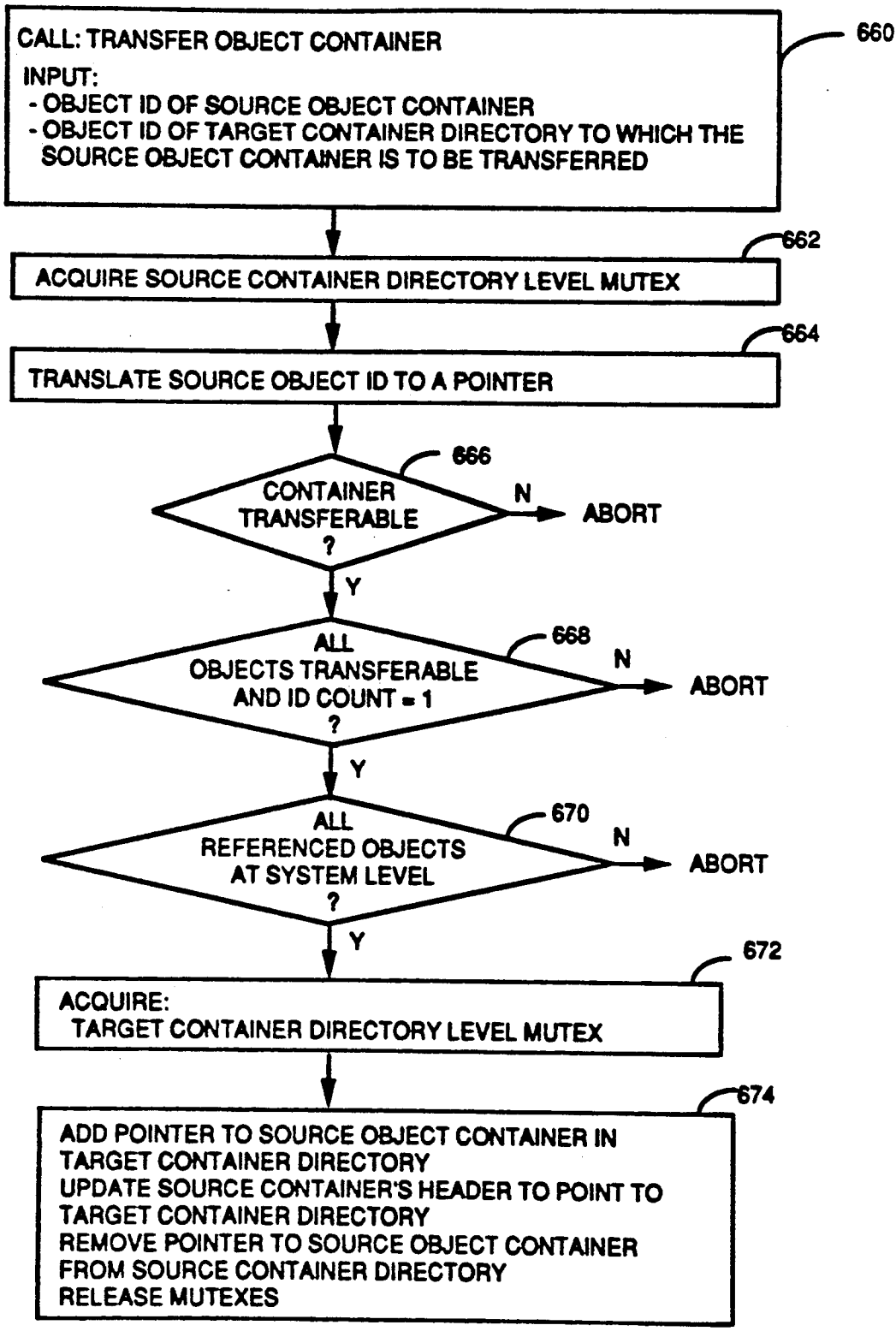
FIG. 15 is a flow chart of the process for transferring an object container to a specified container directory.

Referring to FIG. 15, there is shown a flow chart of the routine for transferring an object container to a specified container directory. The input parameters (box 660) to the routine are the object ID of the source object container to be transferred, and the object ID of the target container directory to which the source object container is to be transferred.

The routine begins by acquiring the mutex for the source container directory level of the source object container (box 662) and obtaining a pointer to the source object container (box 664). Then the object container's transfer flag is tested (box 666). If the transfer flag is clear, the container is not transferable and the routine aborts. Otherwise, the routine continues by checking all the object IDs in the container (boxes 666, 668 and 670). In order for the container to be transferable, all the objects in the container must be transferable, and all must have an ID count equal to 1 (i.e., there must be no reference IDs for any of the objects in the source container) (box 668). If any of the objects in the container do not meet this criteria, the routine aborts.

Next, all the reference IDs in the source object container, if any, are checked to make sure that all the objects referenced are system level objects (i.e., have a level value 376 in the object header which designates the system level) (box 670). If not, the routine aborts.

If all the above tests were passed, the routine continues by acquiring the mutex for the target container directory (box 672). Then it adds a pointer to the source object container in the target container directory, updates the source container's header (i.e., the container pointer field 372) to point to the target container directory, removes the pointer to the source container from the source container directory, and finally releases all the acquired mutexes (box 674). As a result the specified object container has been transferred to the specified target container directory, typically for a newly created job or a newly created process.

CREATE IF OBJECT NOT ALREADY PRESENT

Within a computer application, it is sometimes necessary for several programs to work in conjunction with one another. In this environment, it is not unusual for the programs to share access to the abstractions represented by objects. In some cases it is difficult to determine, or at least not relevant to the problem being solved, which program will be ready to access the shared objects first.

The present invention provides a condition object creation routine which creates an object if it is not already present, herein called the Create If semantic. This allows a set of application programs to all be designed as if they were to all create each shared object. When an application attempts to create a shared object, the conditional object creation routine checks to see if the object already exists. If so, then the attempt to create the object simply returns the object ID of the already existing object.

Figure 16:
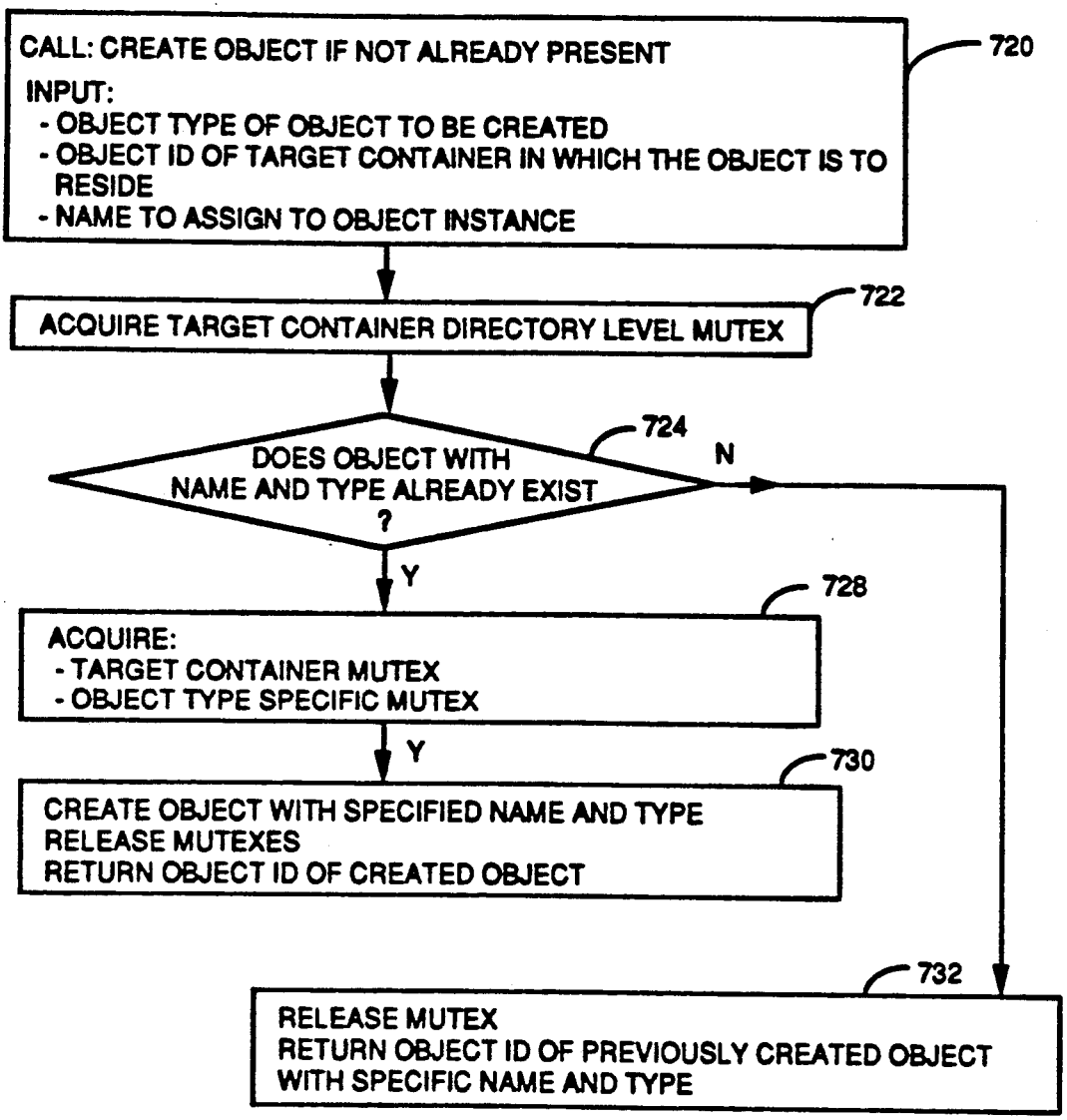
FIG. 16 is a flow chart of the process for conditionally creating a specified object.

Referring to FIG. 16, the conditional object creation routine requires inputs of the object type of the object to be created, the object ID of the target container in which the object is to reside, and a name that is to be assigned to the object (box 720). The routine begins by acquiring the mutex for the target container directory level (box 722). Then it checks the list of objects in the target container to see if that container already contains an object with the specified name and type (box 724). If such an object does not already exist, the routine acquires the required mutexes for creating a new object (box 728). Then it creates the specified object in the target container, releases the acquire mutexes, and returns the object ID of the new object to the caller (box 730).

Otherwise, if the specified object already exists, the routine returns the object ID of the object which already exists in the target container (box 732).

ACCESS CONTROL LISTS

Any resource in the computer system can be protected so that only certain users can access it, or the resource can be left unprotected so that all users can access i,t. The present invention controls access to resources by checking the user's access rights against the resource's access control information to verify that the user has access to the resource.

Any resource that needs to be protected must be ari object or must have an object associated with it. The access to a resource is checked indirectly by the executive's routine which translates an object ID into a pointer to an object. Whenever a program references an object by its object ID, the access rights of the user are compared with the access control information in the object.

Figure 17:
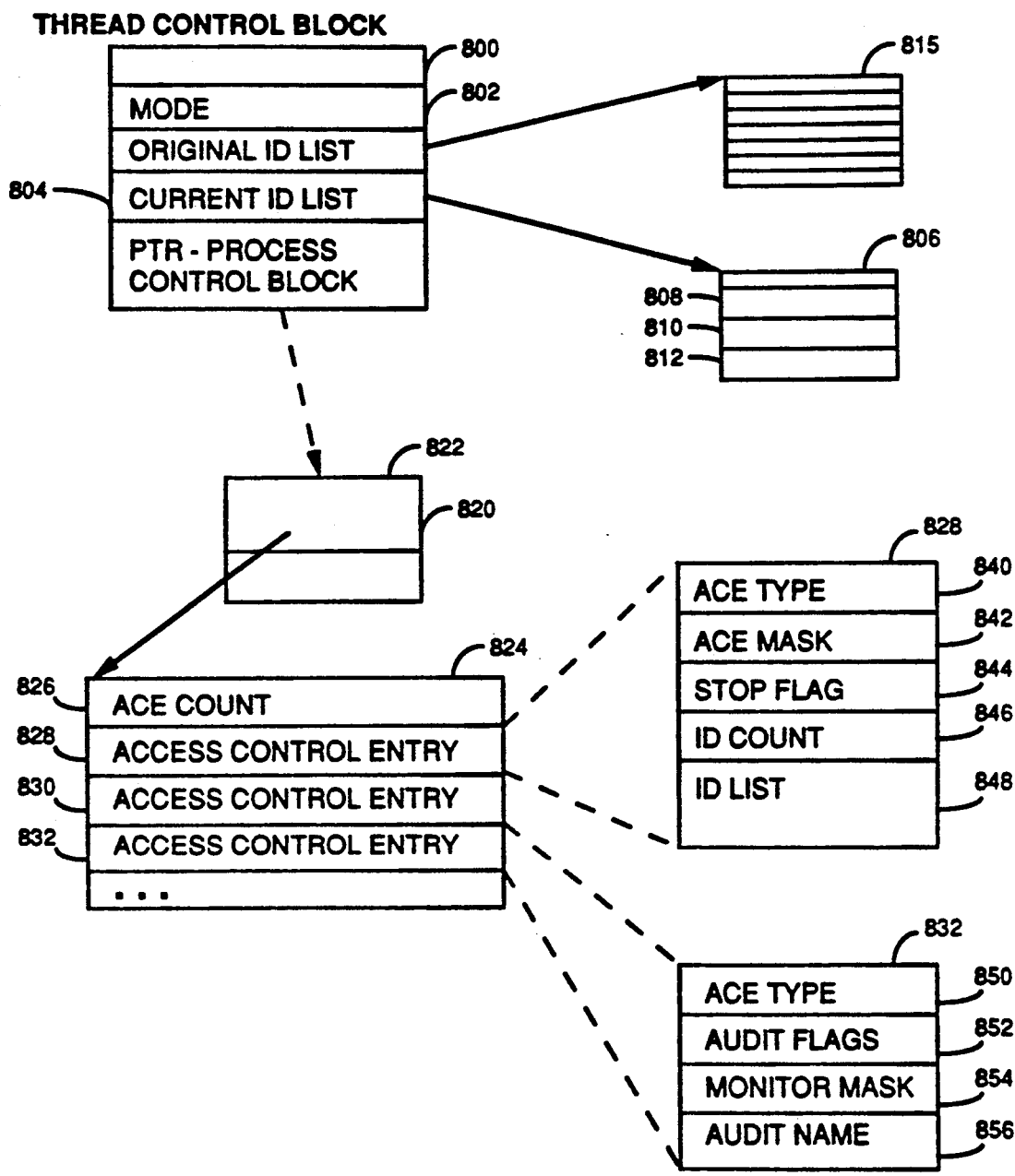
FIG. 17 is a block diagram of the access control list for an object and a execution thread which is attempting to access the object.

Each user of the system is given a set of access rights in the form of an "ID list". Access rights represent the user's claims to resources on the system. Access rights are kept in each thread owned by a user. Referring to FIG. 17, the thread control block 800 (which is part of the object body of a thread object) of a thread contains a mode value 802, a pointer 804 to an ID list 806.

The mode 802 is the processor mode in which the thread is executing. The mode is either User or Kernel. The ID list 806 contains a list of 32-bit values called identifiers 808, 810, 812, the first of which is called the "user identifier" because it is unique to each user of the system. The identifiers represent who the user is and what groups he is a member of. The user is assigned the same identifiers each time that he gains access to the system. Each identifier also has an alphanumeric name at the human interface level.

In some circumstances, a thread can have two distinct ID lists 806 and 815, where the first list 815 is the list originally given to the thread, and the second list 806 is a list adopted temporarily for executing a set of tasks for another process.

The preferred embodiment of the present invention does not provide "privileges" in the access rights of a user. Instead, privileged access to objects is implemented using identifier lists and access control on objects.

Each object 822 has access control information that describes the access rights needed by a user to gain access to a resource. The object header 820 contains the access control information.

The access control information of an object is made up of three parts: a mode, an owner identifier, and an access control list (ACL). The mode is the processor mode (User or Kernel) in which the object was created. The owner identifier is the user identifier of the object which created the object. The ACL is a list of one or more access control entries. Referring to FIG. 17, the header 820 of an object 822 contains a pointer to the access control list 824 for the object 822, if any.

The ACL 824 contains an ACE count 826, which is equal to the number of access control entries (ACES) 828, 830, 832 in the ACL. There are two types of access control entries: access entries and audit entries. Each access entry 828 contains an ACE type value 840 which indicates this is an access entry, an ACE Mask 842 which indicates the type of access governed by this ACE, a Stop Flag 844 explained below, and an ID count 846 which specifies the number of identifiers there are in the entry's ID list 848. In order to gain access to the object, the thread's identifier list 806 must contain identifiers matching all the identifiers in the ACE's ID list 848, and the type of access requested must be a subset of the access types specified by the ACE Mask 842.

TABLE 2

| ACCESS MASK | | |
|---|---|---|
| MASK BIT | ACCESS TYPE | DESCRIPTION |
| 01 | READ | Read data from Object |
| 02 | WRITE | Write data into Object |
| 03 | DELETE | Delete Object |
| 04 | WAIT | Wait for signaling of Object |
| 05 | ALLOCATE | Allocates Object |
| 06 | SET ACL | Sets/Changes ACL of Object |
| 07 | SET NAME | Sets Name of Object |
| 08 | SET OWNER | Sets Owner of Object |
| 09 | GET INFO | Gets general information about Object |
| 17-32 | — | Object Specific Access Types |
| EXAMPLE: QUEUE OBJECT | | |
| 17 | ADD HEAD | Add item to Head of Queue Object |
| 18 | ADD TAIL | Add item to Tail of Queue Object |
| 19 | REMOVE HEAD | Remove item from Head of Queue Object |
| 20 | REMOVE TAIL | Remove item from Tail of Queue Object |
| EXAMPLE: OTD OBJECT | | |
| 17 | CREATE OBJECT | Create Object of the type specified by the OTD |
| EXAMPLE: PRIVILEGED OPERATION OBJECT | | |
| 17 | PERFORM OPERATION | Perform Privileged Operation |

Referring to Table 2, the Access Mask 842 is a set of 32 bit flags which indicate various types of access. For instance, if bit 01 is set in the Access Mask 842, then the ACE 828 governs READ access to the object. If bit 02 is set in the ACE Mask 842, the ACE 828 governs WRITE access to the object. The first sixteen bits of the ACE Mask 842 concern standard types of access which apply to all types of objects.

The second sixteen bits of the ACE Mask 842 are object type-specific. For instance, OTD objects use ACE Flag 17 as the bit for "Create Access"—i.e., the right to create objects of the type specified by the OTD object. Table 2 also shows an example of object type-specific access types of a queue object.

Referring to FIG. 9, the access mask 412 in each OTD is a bit mask which is used in conjunction with access control lists. In particular, the access mask 412 determines which types of access are defined for objects of the type corresponding to the OTD. The only types of access allowed to objects of that type are access types for which the corresponding bits are set in the access mask 412. The definitions for the bits in the access mask 412 have a one to one correspondence to the definitions for the bits in the ACE Mask 842 of each ACE 828.

Referring to FIG. 17, the purpose of audit ACE's such as ACE 832 is to monitor access to an object. Each audit ACE 832 contains an ACE type 850 which specifies that this is an audit ACE.

The Audit Flags field 852 contains three flags that, when set, modify the characteristics of the audit to be performed. These flags are specific to one audit ACE. The Audit Flags include a Success Flag, a Failure Flag, and an Alarm Flag. When the Success Flag is set, the audit ACE is checked whenever access is granted by the system's access checking routine. The Failure Flag, when set, specifies that the Audit ACE should be checked whenever access is denied by the system's access checking routine. The Alarm Flag is examined if a message is generated from the Audit ACE. This flag, when set, specifies that the type of message generated from the Audit ACE is an alarm message. If the Alarm Flag is clear, an audit message is generated. An audit message signifies the occurrence of a normal event. The message can be written to a log file and examined later. An alarm message signifies the occurrence of an abnormal event. Alarm messages are typically logged to a security console so that immediate action can be taken by the security manager.

The monitor flags 854, which correspond to the ACE Flags and the bits in the access mask 412 for the OTD, indicates the types of access to be monitored by the Audit ACE 832. The Audit Name 856 is the name of the message unit (or channel) into which the messages generated by the audit ACE are written.

Appendix 1 contains a pseudocode representation of the process for checking the ACL of a specified object and determining whether a user is to be granted access to the specified object. The pseudocode program in Appendix 1 at the end of this specification is written using universal computer programming conventions and are designed to be understandable to any computer programmer skilled in the art. Comments and unexecutable statements begin with a double asterisk "**".

According to the steps of the ACL checking process as shown in Appendix 1, access is denied if the access desired by the caller of the check access routine is not supported by the object. If the access type desired is supported by the object, and the caller's access mode is KERNEL, then access is automatically granted. In other words, access checking beyond checking for supported types of access is performed only for USER mode callers.

If the object does not have an ACL and the mode of the object is USER, access is granted. Otherwise the mode of the object is KERNEL and access is denied.

If the object does have an ACL the following steps are performed for each access ACE in the ACL. If the user's ID list holds the identifiers listed in the ACE's ID List 848, then if the access desired is allowed by the access ACE, access is granted. However, if the user's ID list holds the identifiers listed in the ACE ID List but the type of access desired is not allowed by this access ACE then the Stop Flag 844 of the ACE is inspected. If the Stop Flag 844 is set, this means that no more ACEs should be examined, and access is denied. If the Stop Flag 844 is not set, the access checking process continues to examine any additional ACEs there may be in the ACL.

This process continues until either all the access ACEs have been checked, or the caller is positively denied access.

The purpose of the Stop Flag 844 is to explicitly prevent specified users from accessing an object, or to explicitly limit their access to certain specified access types. To prevent or limit access to an object by a specified user (or set of users), the ACL for the object is given an ACE 828 with a set Stop Flag 844, an ID list 848 that specifies this user (or set of users), and an ACE Mask 842 that lists the access types (if any) allowed to the specified user. When the specified user tries to access the object 822, the access checking routine will not inspect any ACEs after the ACE with the set Stop Flag.

One last type of access is allowed: if the caller holds the object's owner ID, then the caller is allowed "SET_ACL" access to the object—which allows the caller to modify the object's ACL.

PRIVILEGED OPERATION OBJECTS

As stated above, the object based architecture of the preferred embodiment does not have "privileges". In the present invention, the number of allowable privileged operations is not limited, unlike most prior art system which allocate privileges to the users of the system.

Identifiers and Access Control Entries (ACES) in access control lists are used instead of privileges. For example, a user may create a new container and then specify that it be inserted into the system-level container directory. Because the container directory is at the system level, this is a restricted operation.

To control usage of a restricted operation, such as adding object containers to the system container directory, an ACL is added to the eystem level container directory. An identifier, called SYSTEM_LEVEL, is created and given to the group of users who are to be allowed insert object containers into the system level container directory. More specifically, the ACL for the system level container directory contains a separate ACE for controlling WRITE access to the container directory. The identifier list for this ACE contains just one identifier: the SYSTEM_LEVEL identifier. Thus any user that is granted this identifier can insert a new container into the system-level container directory.

As can be seen by the previous example, access to most privileged operations is controlled simply by using the ACL mechanism to determine which users have access to a corresponding object. Some privileged operations, however, do not inherently reference an object. For example, setting the system time is a privileged operation, but does not involve an object. To protect this privileged operation from unauthorized use, a special object is created and the privileged operation is defined to reference the special object. More specifically, the code for the privileged operation is modified so that it will perform the privileged operation only if the user has a predefined type of access (i.e., PERFORM OPERATION access) to the special object.

Figure 18:
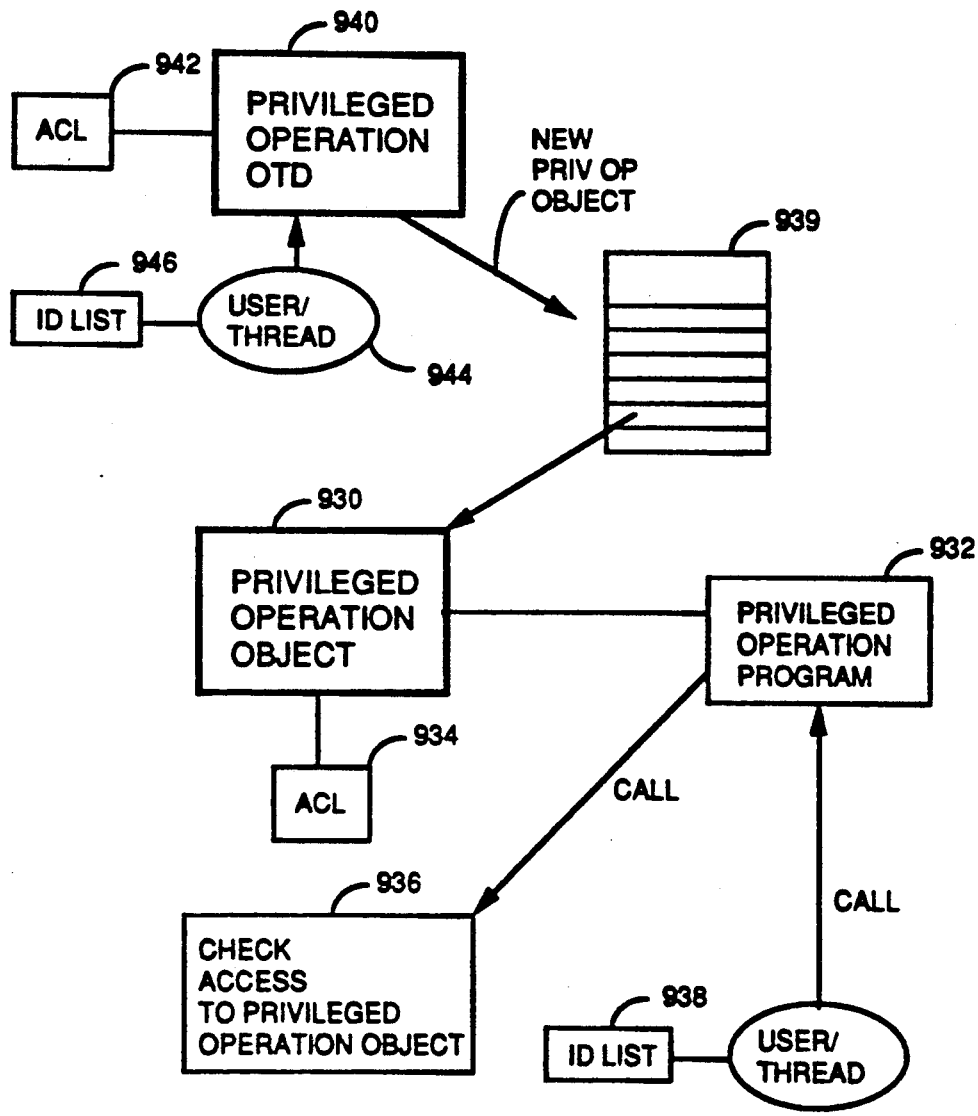
FIG. 18 is a block diagram of the data structures for privileged operation objects.

Referring to FIG. 18, this special object is herein called a Privileged Operation Object 930. If a user (i.e., thread) has access to a particular Privileged Operation Object, then the user is allowed to perform the corresponding operation 932. If a user does not have access to a particular Privileged Operation Object, then the user is not allowed to perform the corresponding operation.

Thus, a Privileged operation Object represents a privileged operation. Each privileged operation that does not inherently reference an object has a privileged operation object associated with it. The name assigned to the privileged operation object is usually the name of the privileged operation. The ACL 934 on the privileged operation object determines the users who can perform the privileged operation.

More specifically, a user must have PERFORM OPERATION access to the privileged object in order to perform the corresponding privileged operation. This means that (1) the routine 932 which runs the privileged operation verifies access (box 936) to a specific one of the access types for the privileged operation object (i.e., an object specific type of access), (2) the privileged operation object has an ACL which lists one or more identifiers needed for the specified type of access, and thus (3) the user's ID list 938 must include the identifier(s) listed in the ACL in order to be able to use the privileged operation. PERFORM OPERATION access means having identifier(s) which match those in the ACL for the Privileged Operation object.

For example, the object used to control access to the routine for setting the system's clock is called the SET_SYSTEM_TIME privileged operation object. A user must have PERFORM OPERATION access to the SET_SYSTEM_TIME privileged operation object in order to set the system's clock. This means that the user's ID list must contain all the identifiers included in the access ACE which governs PERFORM OPERATION access to the SET_SYSTEM_TIME privileged operation object.

A privileged operation object is created by calling a object creation service routine which uses the OTD for Privileged operation Objects to create a new object. Note that the length of the object body of Privileged operation Objects is zero. The creator of the object inserts in the object an ACL which defines the identifier(s) needed in order to have PERFORM OPERATION access to the object. All Privileged Operation Objects are stored in a specific system level container called the Privileged Operation Container 939.

Privileged Operation objects are a distinct object type, and thus have a distinct OTD 940 (object type descriptor) which defines the format and routines which support this obj ect type. The ACL 942 for the Privileged Operation Object OTD has an object specific access type, called CREATE OBJECT access. See the above discussion for object specific access types.

Only users 944 with CREATE OBJECT access (see Table 2) to the Privileged Operation Object OTD are allowed to create Privileged Operation Objects. Thus the ACL mechanism for Privileged Operation Object OTD prevents the proliferation of privileged operation objects that might otherwise be created by unauthorized users. More specifically, a special identifier called CREATE PRIVILEGED OPERATION OBJECT is included in an Access Control Entry for the ACL 942 for the Privileged Operation Object OTD 940. Only users 944 who have this special identifier in their ID list 946 are allowed to generate new privileged operation objects. Conceptually, the OTD for privileged operation objects can be considered to be a special type of privileged operation object—because it protects the privileged operation of generating new privileged operation objects.

OBJECT ALLOCATION

An object may be allocated to a user object, job object, process object or thread object. Generally, the purpose of object allocation is to give a particular user, job, process or thread exclusive use of a particular system resource. For instance, an object representing a computer terminal may be allocated to a specified job object. An object may also be allocated to an "allocation identifier object", which is a special type of object that is used to give a predefined set of users exclusive access to a system resource, such as a tape drive. object allocation differs from the access control lists in that object allocation prevents access by threads which would otherwise be authorized to access a particular object according to the object's ACL.

The visibility level of an object determines the level of the allocation "class" (i.e., visibility level of the allocation object) to which the object can be allocated. For instance, an object at the system level can be allocated to any of the five types of allocation classes (user, job, process, thread, or allocation identifier), but an object at the process level of visibility can only be allocated to process and thread objects.

Figure 19:
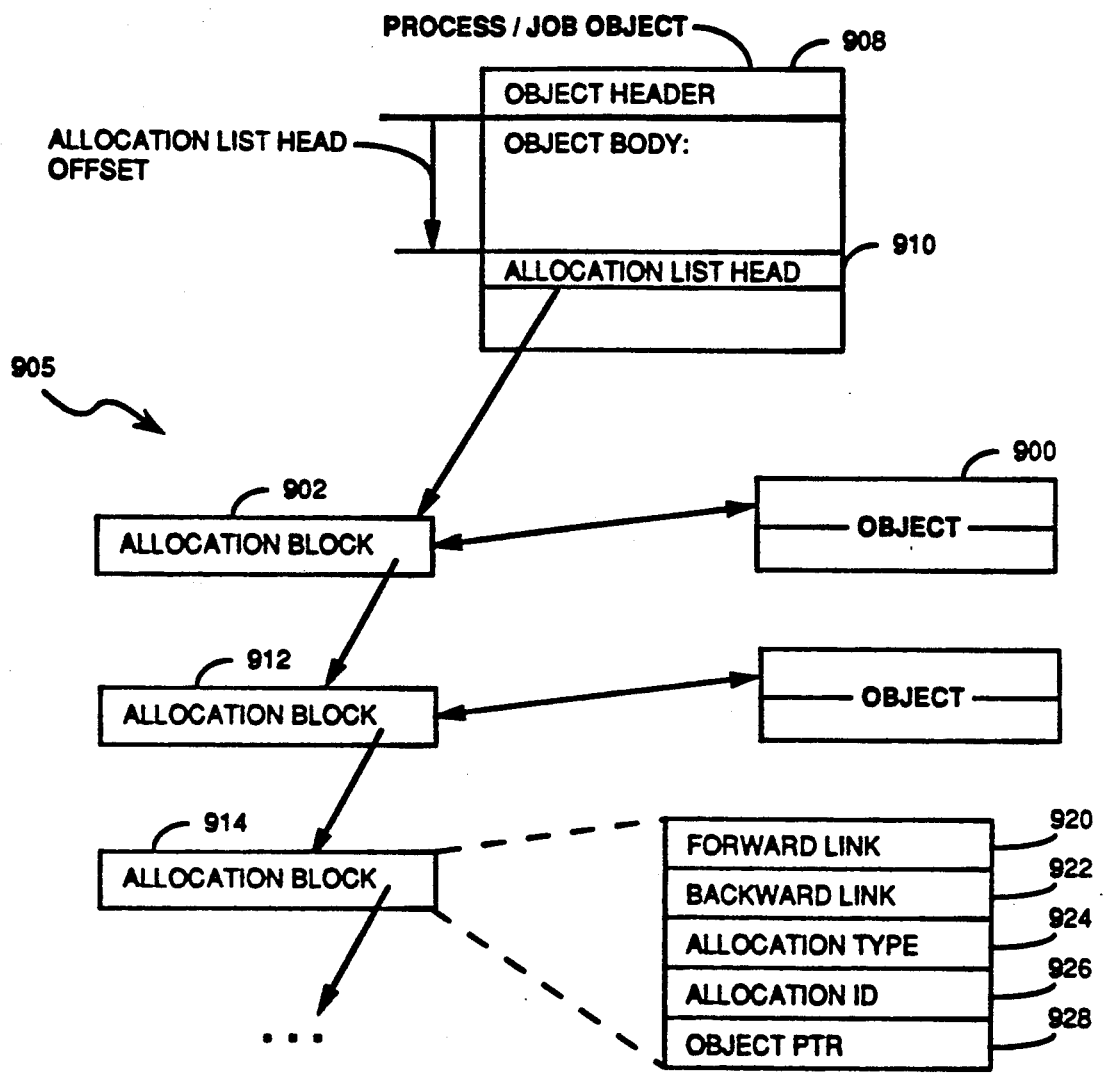
FIG. 19 is a block diagram of the data structures for allocating a set of objects to a thread, process, job or user.

Referring to FIG. 19, when a object 900 is allocated an allocation block 902 is created and the allocation block 902 is linked into a list of allocation blocks 905 for the allocation object 908 to which the object 900 has been allocated. When an object 900 is allocated, a pointer to the allocation block 902 is stored in the header of the allocated object 900.

The list head 910 for the list of allocation blocks 905 is stored in the body of the allocation object 908, at the position in the object body specified by the Allocation List Head Offset field 389 in the allocation object's header (see FIG. 8).

Each allocation block 902, 912, 914 contains a forward link 920 and a backward link 922 for forming a doubly linked list 905 of allocation blocks. An allocation type field 924 indicates whether the allocation object is a user object, job object,, process object, thread object, or an allocation identifier object. The allocation ID field 926 contains the ID of the allocation object 908, and the object pointer field 928 points to the header of the object that has been allocated.

Note that an object cannot be allocated unless its object ID count is equal to one, because the existence of one or more outstanding reference IDs indicates that other threads need access to the object.

Whenever a thread attempts to access an object by translating an object ID, the access checking routiliw checks to see if the allocation block pointer in the object header has a non-zero value. If so, this indicates that the object ID refers to an object that has been allocated. It then checks to see if the object has been allocated to an object that corresponds to the thread. If so, access is allowed, otherwise it is denied.

WAITABLE OBJECTS

Computer applications and operating systems often need synchronization mechanisms to help coordinate access to resources or data. The present invention provides a set of "kernel synchronization primitives", which are incorporated in "waitable objects" for synchronizing processes with specified events. Waitable objects are user accessible objects which can be "waited on"—which means that a thread can be suspended until the status of the waitable object is changed to a predefined state called "signalled".

As will be discussed below, the present invention enables users not only to generate new instances of predefined types of waitable objects, but it also allows users to define new types of waitable objects without having to modify the wait service routines and the scheduler in the operating system's kernel. Thus users of the system can create customized waitable objects without having any detailed understanding of how the kernel's wait servicing software works.

Figure 20:
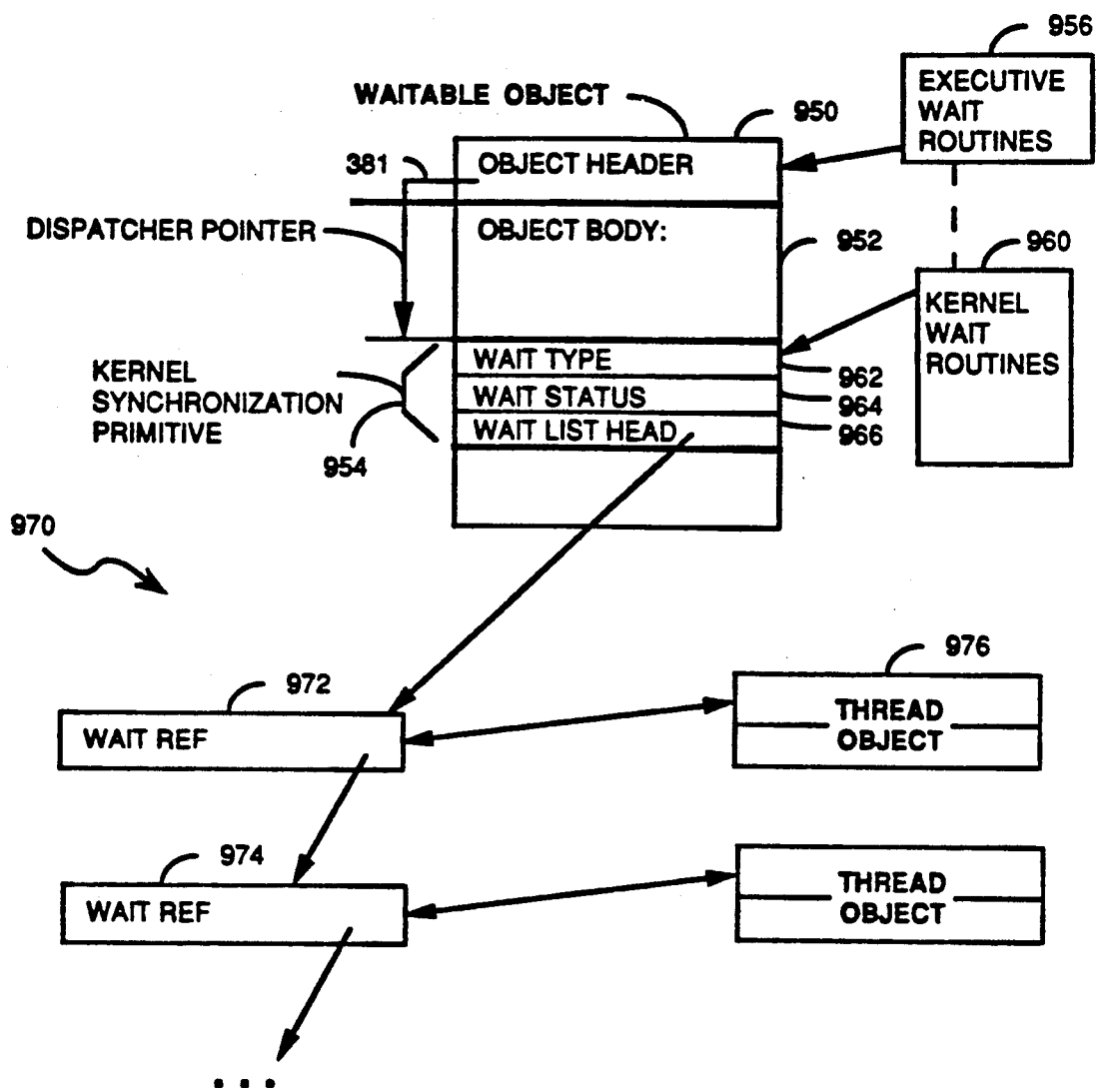
FIG. 20 is a block diagram of the data structures for implementing user defined waitable objects.

Referring to FIG. 20, when an object 950 is designated as a waitable object, then its object body 952 includes a kernel synchronization primitive 954. The position of the kernel synchronization primitive 954 in the object body 952 is specified by the dispatcher pointer 381 in the object's header.

Kernel synchronization primitives, which are sometimes called dispatcher objects or kernel synchronization objects, and the objects in which they reside, are defined to be in one of two states: Unsignalled, or Sjgnalled. These states are said to be the signal state of the object or kernel synchronization primitive.

The system provides executive wait service routines 956 and kernel wait service routines 960 for use by programs needing to synchronize activities. These service routines will be discussed in more detail below.

The preferred embodiment provides four types of kernel synchronization primitives that can be used in user accessible objects. These primitives are as follows.

A notification event remains signalled until explicitly unsignalled.

A synchronization event, once signalled, remains signalled until a wait is satisfied. Satisfaction of a wait automatically changes the state to unsignalled.

A semaphore is used to control limited, but not exclusive, access to a resource. A semaphore is created with an initial count. As long as that count is non-zero, then the semaphore is signalled. The count is decremented each time a wait on the semaphore is satisfied.

A timer is used to wait for a specific amount of time to pass. A timer contains an expiration time. Initially, a timer is unsignalled. When the expiration time occurs, the timer is changed to signalled.

Mutexes are the kernel synchronization primitive used to control exclusive access to a resource. The state of a mutex is controlled by a count. When the count is 1 (signalled state), the mutex is not owned and access to the resource associated with the mutex can be allowed. Granting ownership of a mutex causes the count to be decremented to 0 (unsignalled state), whereupon no other thread is able to gain access to the resource until the owner thread releases the mutex. Waiting on (acquiring) a mutex suspends the execution of the invoking thread until the mutex count is 1. Satisfying the Wait causes the count to be decremented to 0 and grants ownership of the mutex to a waiting thread. Mutexes, generally, cannot be incorporated into the body of a user accessible object in order to form a waitable object. This is because mutexes must be used only in contexts where the mutex is held f or short periods of time. Notification and synchronization events are used in contexts where a thread will need exclusive access to a system resource f or a longer period of time.

Wait requests are requests by threads to be synchronized with a specified waitable object by suspending the thread until the specified waitable object is signalled. The kernel synchronization primitive 954 (in the waitable object 950) includes a Wait Type field 962 which specifies the type of the kernel synchronization primitive. A Wait Status field 964 which indicates whether the kernel synchronization primitive is signaled or unsignalled, and also stores such parameters as the count for a semaphore and the expiration time for a timer. A wait list head 966 points to a list 970 of wait references 972, 974. Each wait reference denotes one thread 976 which is waiting on the kernel synchronization primitive.

The kernel wait service routines 960 include the following routines for controlling the state of kernel synchronization primitives. Set_Event is used to set the state of either a notification or synchronization event to signalled. Clear_Event is used to set the state of either a notification or synchronization event to unsignalled.

Pulse_Event is used to set the state of either a notification or synchronization event to signalled and then immediately changes it to unsignalled. When used with a notification event, this has the effect of satisfying all current wait requests, while preventing future requests from being satisfied.

Release_Semaphore is used to cause the semaphore's count to be incremented. If the count is incremented from zero to one, then the state of the semaphore is changed to signalled.

Set_Timer is used to Bet the expiration time of a timer kernel synchronization primitive. This causes the timer to become unsignalled.

When a wait operation is to be performed by a user process on one or 2nore specified waitable object instances 950, the user process calls one of two execute wait service routines 956: "Executive Wait Single" or "Executive Wait Multiple". These executive wait service routines accept the object IDs of one or more waitable objects. Executive Wait Single suspends the issuing program until a specified waitable object becomes signalled. Executive Wait Multiple can be used to wait on two or more specified waitable objects. The Executive Wait Multiple routine has two modes of operation which can be specified by the user: it either (1) suspends the issuing program until any of the specified waitable objects becomes signalled, or (2) suspends the issuing program until all of the specified waitable objects become signalled. A timeout value may also, optionally, be supplied to indicate that if the wait has not completed after the timeout has expired, the program should resume anyway.

The kernel wait service routines 960 include two corresponding routines: "Wait Singlell and "Wait Multiple". The difference between the executive and kernel versions of these routines is that the executive routines are called by a process which specifies the object IDs of one or more waitable objects, while the kernel routines are called by the executive which specifies pointers to kernel synchronization primitives that are to be waited on.

When a user process calls one of the executive wait routines it specifies the object ID(s) of the waitable object(s) that it wants to wait on. The executive wait routine translates each specified object IDs into an object pointer, and then inspects the Dispatcher Pointer 381 in the referenced object to make sure that the object is a waitable object. If the Dispatcher Pointer is not nil, the referenced object is a waitable object. The executive then calls one of the kernel wait routines 960 to perform a kernel wait operation on the kernel synchronization primitive 954 pointed to by the Dispatcher Pointer 381.

When a wait request completes normally (that is, does not time-out) the wait is said to have been satisfied.

Waitable objects are created by storing the data structure for an kernel synchronization primitive in the object body of an object instance (at an position in the object body specified by the Dispatcher Offset field 410 of the OTD for this object type), setting the Dispatcher Pointer 381 in the object header to point to the kernel synchronization primitive, and then calling a corresponding kernel service routine for initializing the dispatcher object. once initialized, the kernel synchronization primitive can then be manipulated by using other kernel wait service routines.

As discussed above with reference to FIG. 10, it is a feature of the present invention that there is a simple procedure for defining new types of objects and a corresponding set of object type-specific routines for interacting with the system. As shown in FIG. 10, all OTDs are obj ects stored in a system level container 460 called the OTD Container. To define an new type of waitable object the same procedure is used as for creating other object types. The primary special considerations for creating new types of waitable objects are as follows.

The OTD for a new type of waitable object must provide a non-negative dispatcher offset 410 which specifies the position of a kernel synchronization primitive in the object body. In addition, the routine 440 for creating new instances of this object type must store the data structure for an kernel synchronization primitive in the object body of an object instance, set the Dispatcher Pointer 381 in the object header to point to the kernel synchronization primitive, and then call a corresponding kernel service routine for initializing the dispatcher object. Finally, if the new type of waitable object needs to be explicitly signalled or unsignalled by user mode programs, the creator of the new waitable object type must provide an executive interface that can be called by user mode threads. The executive interface for the waitable object comprises one or more executive wait service routines which call the appropriate kernel wait service routines for signalling and unsignalling specified waitable objects of this type.

For example, it would be possible to create a new type of waitable object called a Waitable Privileged Operation Object. In this example, a semaphore kernel synchronization primitive would be incorporated in the Waitable Privileged Operation Object. The purpose of making a Waitable Privileged operation object that incorporates a semaphore would be to limit the number of users which simultaneously perform a particular privileged operation. To perform this particular privileged operation, a user would have to wait on the privileged operation object until the semaphore's count value is non-zero.

SERVER IMPERSONATION OF CLIENT

One feature of the present invention is that a multitasking, multiuser computer system incorporating the invention can provide one or more "server processes" which perform services for "client processes" in one or more other computers 132 (shown in FIG. 1). The other computers 132, coupled to the CPU 102 by a bus interface 134, can send tasks to the server processes in computer system 100 for execution. In this context, the computer system 100 is said to be a "compute server" for the other computer 132.

It is also possible for one process to "serve" (i.e., perform a task or set of tasks) another within the "same computer system" (i.e, the computer system may have raultiple processors which share the running of multiple processes). For instance, a server process might be set up to perform a sensitive task that requires access to a valuable, sensitive or shared system resource. Other "client" processes could then call the server process to perform this task, but the server would maintain complete control of the task and would perform the task in parallel with the operation of the client process. This can be used to protect a particular system resource and/or localize specialized knowledge or a process to a single server process.

Thus, in general, a "server" is a process, separate from a "client" process, that performs some service for a client.

"Impersonation" is herein defined to mean the process by which one thread assumes the characteristics of another thread in order to perform some service for that thread. In the present invention, impersonation is used by multiclient servers to perform work on behalf of a client. Further, the only characteristics that are impersonated in the preferred embodiment are the identifiers held by the client.

Note that the access mode of the client is not impersonated. When the server accesses an object, while the server is impersonating a client, the system's access check routine (shown in Appendix 1) checks the server's access mode. Since all servers run in user mode, the access mode used for access checks is user mode.

Referring to FIG. 2i, the present invention provides one or more "server" processes 1000 (sometimes called servers), and a plurality of client processes 1002. For the purposes of the present discussion, it makes no difference whether the server process 1000 is on the same computer as the client process 1002 that it is serving.

A "remote procedure call" (RPC) is a procedure call in which the called routine (the server) executes in a different address space and thread than the calling routine (the client.) Remote procedure calls can be made to a thread in the same computer system or in a remote computer system. The primary substantive differences are (1) the details of the protocol for transferring information between the server and client, and (2) the speed of operation of the server may be greatly enhanced if it runs on a higher throughput computer than the computer on which the client is running. Neither of these differences affect the basic impersonation mechanism of the present invention.

While it is convenient to discuss interactions between server and client processes 1000 and 1002, it should be understood that only threads actually execute programs. Thus, it is a client thread 1004 which calls the server 1000, and it is a server thread 1006 which responds to that call.

A set of software called the session control software 1010 establishes the connection between client and server and sets up the impersonation object 1020 which enables the server to perform tasks on behalf of the client. The session control software 1010 manages the connection and disconnection of sessions between a client and server. For a client to communicate with a server, the client must establish a connection to the server. The client does this by requesting the session control software to send a connect message to the server.

As discussed above with reference to FIG. 17, every thread in the pref erred embodiment has a thread control block and a list of user identif iers. Thus the client thread 1004 has a thread control block 1022. The client thread control block 1022 contains a pointer 1024 to the client's ID list 1026 which contains identifiers 1028, 1030, 1032. The identifiers 1028–1032 represent who the client is, what groups he is a member of, and what objects the client can access.

Similarly, the server thread 1006 has its own thread control block 1040 which contains a mode value 1042 and a pointer 1044 to the server own original ID list 1046 is which contains identifiers 1048, 1050, 1052. The identifiers 1048–1052 represent the set of objects accessible to the server. The server thread control block 1040 further includes a pointer 1054 to a "current ID list". The list of identif iers pointed to by the current ID list pointer 1054 is the list that is used by the systems access control routine when determining whether the server is allowed to access a particular object. The original ID list pointer 1044 is merely a mechanism for keeping track of a stored copy of the server's original identifier list 1046.

When a server thread 1006 is initially defined, the current ID list pointer 1054 and the original ID list pointer 1044 both point to the same identifier list 1046. However, while performing a task for a client, the original identifier list 1046 can be saved while the current ID list pointer 1054 points to another identifier list. More specifically, the current ID list pointer 1054 is replaced with a new pointer value during the impersonation process. Then, when the server is finished performing services for the client, the original identifier list 1046 is reestablished by copying the original ID list pointer 1044 into the current ID list pointer 1054.

The server thread 1006 will generally have a different set of identifiers from those of a client, and theref ore will not have the identifiers needed to access objects that a client wants the server to work with. The present invention enables the server to use a client's identifiers while serving the client, and to restore the server's original identifiers after completing a task for a client.

Figure 22:
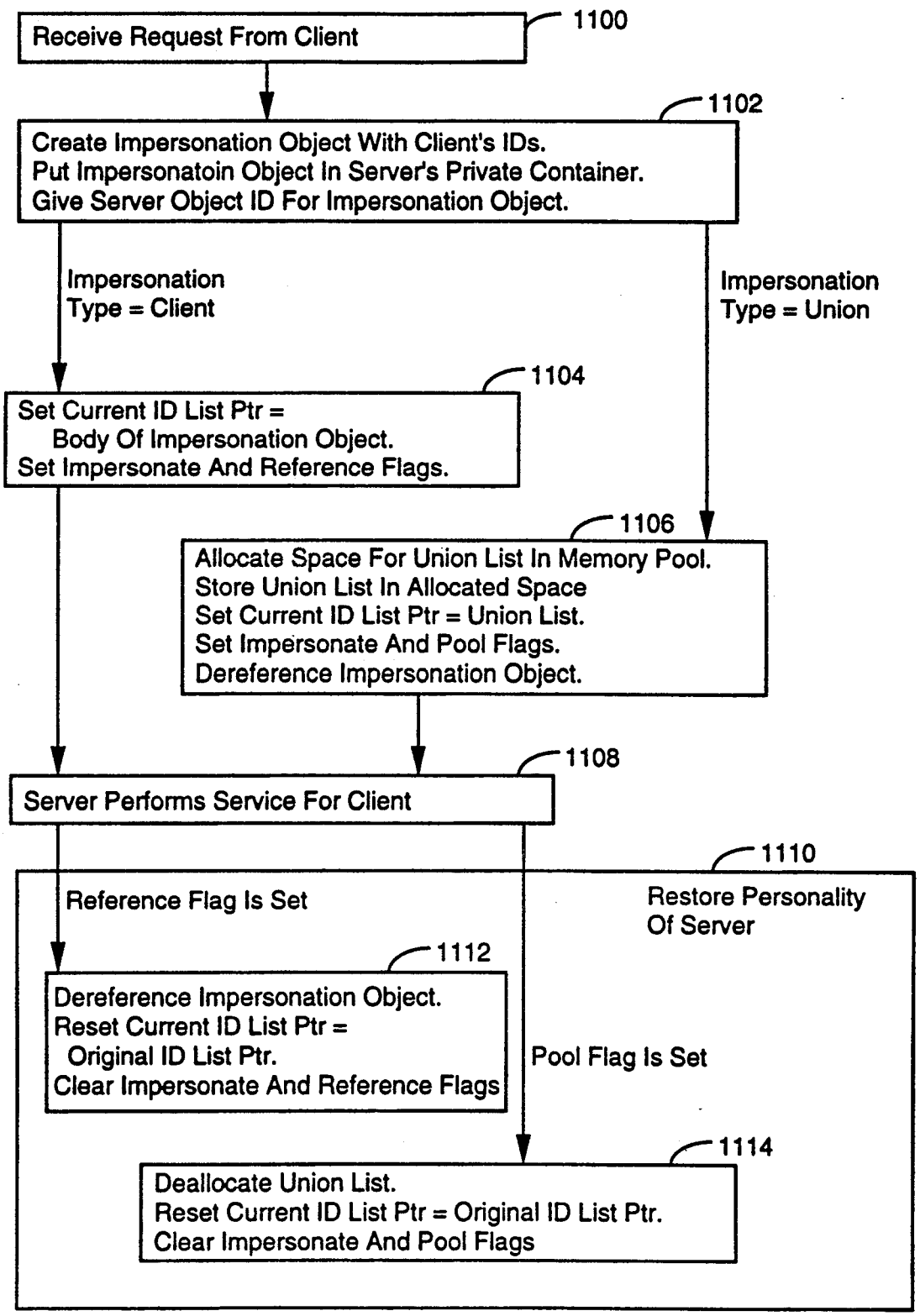
FIG. 22 is a flow chart of the impersonation process.

Referring to FIG. 22, when a client thread 1004 needs to establish a connection to a server 1000, the client does this by sending a connect message to the server (box 1100). At the time a connection request is detected from a local client (i.e., a client on the same computer) or a connection message is received from a remote client (i.e., a client on another computer), the session control software captures the client's characteristics information and generates an impersonation object 1020 (box 1102).

Figure 21:
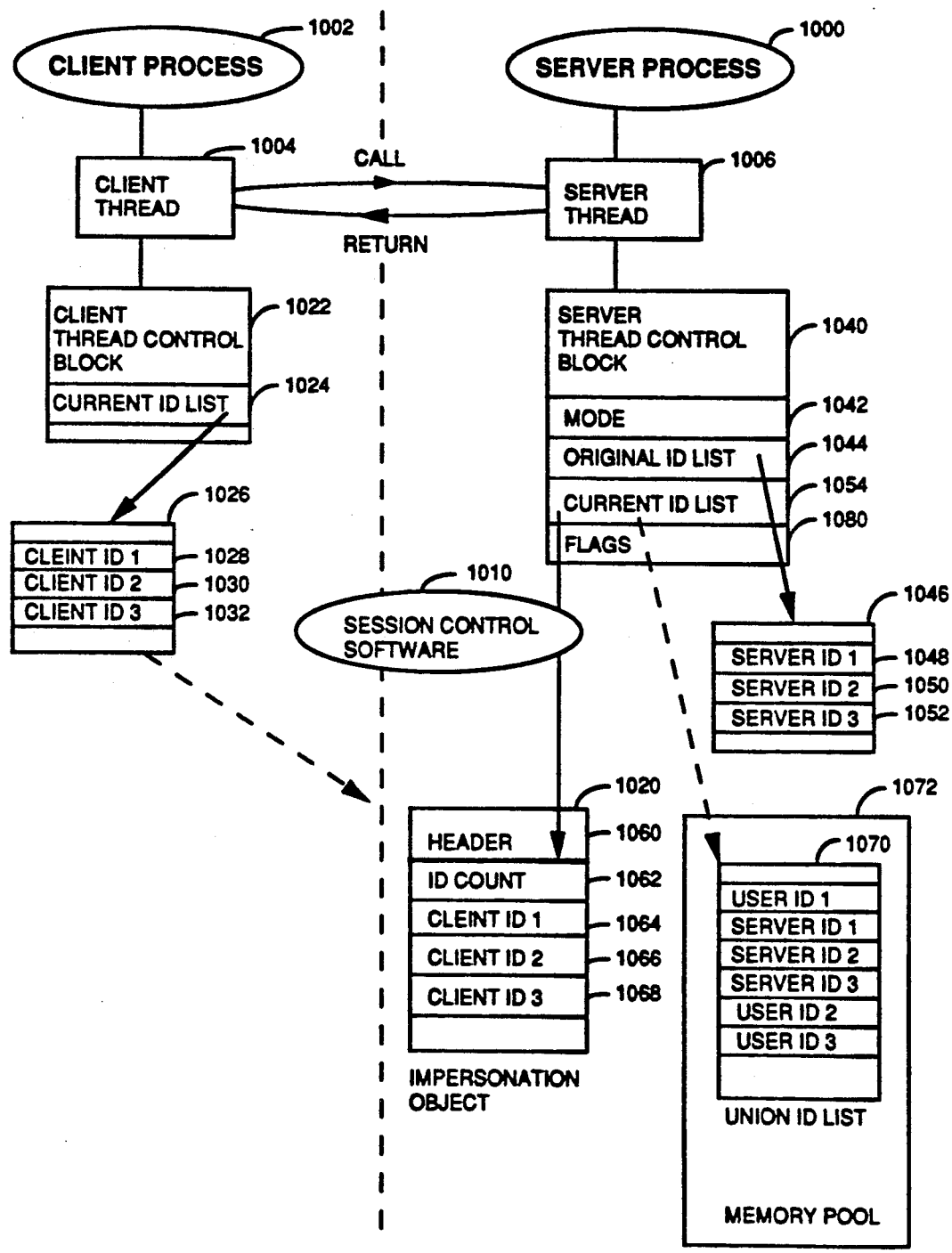
FIG. 21 is a block diagram of the data structures for a server thread impersonating the characteristics of a client thread.

Referring to FIG. 21, an impersonation object 1020 is a distinct type of object in the operating system of the present invention. It has a standard object header 1060. The body of the impersonation object 1020 contains an ID count 1062, which indicates the number of identifiers in the client's ID list 1026, and a list of identifiers 1064, 1066, 1068 which are a copy of the identifiers in the client's ID list 1028-1032.

The session control software 1010 creates an impersonation object by first creating an impersonation object instance, and then copying a specified client's ID list 1026 into the body of the impersonation object 1020. The session control software 1010 inserts the impersonation object 1020 in the process private object container for the server process 1000. The session handler 1010 also provides the server thread 1006 with the object ID of the impersonation object 1020 representing the client's characteristics (box 1102 in FIG. 22).

Note that the session control software 1010 raust be executing in the context of the server 1000 in order to create the impersonation object, and must be a kernel mode routine in order to copy the client's ID list 1026 into the body of an obj ect. In addition, it should be noted that any thread which generates new impersonation objects must have "create object" access to the impersonation object type descriptor (OTD). This means that the impersonation OTD has an access control list which allows only users with a specified identifier, called Create_Impersonation_Object, to create new impersonation object instances. This is equivalent to the manner in which the creation of privileged operation objects is limited to specified users, as discussed above.

The server 1000 is provided with only an object ID to the impersonation object 1020 instead of an identifier list. An object is used instead of an identifier list because neither the session control software 1010 nor the server 1000 need know what an identifier or an identifier list look like, and because the use of an object allows the use of the client's identifier list to be protected by an access control list. See the above discussion of access control lists.

After the session control software 1010 creates the impersonation object 1020, the next step is for the server thread 1006 to impersonate the specified client by calling an impersonation service routine called Impersonate Client. In the preferred embodiment there are two types of impersonation: one in which the server adopts the client's characteristics in place of those of the server, and one in which the server adopts the union of the client I s and the server's characteristics.

If the server thread 1006 specifies to the Impersonate Client routine that the server will adopt the client's characteristics, the current ID list pointer 1054 is set to point to the body of the impersonation object 1020 (box 1104 in FIG. 22). As a result, the server will be accorded all the rights normally accorded by the client's identifiers, including the types of access to objects created by the client which only the owner (i.e., the client) is normally allowed - such as setting the name and ACL of an object.

If the server thread 1006 specifies to the Impersonate Client routine that the server needs the union of the server's original characteristics and the client's characteristics, the Impersonate Client routine performs the following steps (box 1106 in FIG. 22). First it determines the number of identifiers in the union of the two sets of identifiers. Then is allocates space for a correspondingly sized identifier list 1070 in the system's memory pool 1072, and stores the server's and client's identifiers in the allocated array 1070. Thus the server will be accorded all the rights accorded by the union of the client's identifiers and the server's identifiers. Finally, the current ID list pointer 1054 is set to point to the array 1070 which contains the union of the two sets of identifiers.

The Flags field 1080 in the server's thread control block 1040 contains an Impersonation Flag, a Reference Flag and a Pool Flag. The Impersonation Flag is set whenever the server is impersonating a client. The Reference Flag is set if the current ID list 1054 points to the body of an impersonation object 1020. The Pool Flag is set if the current ID list 1054 points to a list 1070 stored in an array allocated from the memory pool 1072.

If a union or combined identifier list 1070 is created, the server thread 1006 will dereference the impersonation object after setting up the combined identifier list 1070 because the impersonation object 1020 will no longer be needed.

Referring to FIG. 22, after the Create Impersonation routine has set up the server's current ID list pointer 1054 and Flags 1080, the server then performs either a predefined or specified task on behalf of the client (box 1108). While performing this task, the ability of the server to accesses objects in the system will be governed by the identifier list pointed to by the current ID list pointer 1054.

When the server completes execution of its work for the client, the server can "restore its personality" by performing the following steps (box 1110). If the Reference Flag is set, an impersonation object was referenced. Thus the server dereferences the impersonation object, clears the Impersonate and Reference Flags, and then copies the original ID list pointer 1044 into the current ID list pointer 1054 in order to restore the server's original characteristics (box 1112).

If the Pool Flag is set, an identifier list 1070 in the memory pool 1072 was allocated. Therefore the server deallocates the list 1070 so as to return this space to the memory pool 1072. Then it clears the Impersonate and Pool Flags, and copies the original ID list pointer 1044 into the current ID list pointer 1054 in order to restore the server's original characteristics (box 1114).

from the true spirit and scope of the invention as defined by the appended claims.

---

APPENDIX 1
PSEUDOCODE FOR CHECK ACCESS ROUTINE

```
IF ( the access type desired is not included in the access
    mask in the OTD (i.e., is not supported by the object)
    ACCESS IS DENIED
    RETURN
END IF ( the caller's access mode is KERNEL )
    ACCESS IS GRANTED
    RETURN
END

**     The caller's access mode is USER

IF ( the object does not have an ACL )
    IF ( the mode of the object is USER )
        ACCESS IS GRANTED
        RETURN
    ELSE        *** mode of the object is KERNEL
        ACCESS IS DENIED
        RETURN
    END
END

**     The caller's access mode is USER and
**     the object does have an ACL

ACCESS IS DENIED    **    Access Denied unless Granted
                          by the following procedure
IF the ACL has ACEs
    Search the ACL for the first access ACE
    WHILE an access ACE is found LOOP
        IF ( the user's ID list holds the IDs listed
in the ACE's list )
    IF ( the access desired is allowed by the
access ACE )
        ACCESS IS GRANTED
        EXIT LOOP
    ELSE
        IF ( the current ACE's Stop Flag
            indicates more access ACD's
            should NOT be examined )
            EXIT LOOP
        END
    END
        END
        Search the ACL for the next access ACE
    END WHILE LOOP
END
IF ( access is denied )
    If ( the access desired is "SET_ACL" .AND.
        the user is a holder of the object's owner ID )
        ACCESS IS GRANTED
    END
END CALL AUDIT CHECK ROUTINE ** check audit ACEs and generate
                                audit messages
RETURN
```

---

As just explained, the server thread 1006 determines when the impersonation object 1020 is deleted. The server can explicitly delete the impersonation object 1020 after servicing the client, or the server can let the operating system delete the impersonation object as part of process rundown when the server thread exits.

ALTERNATE EMBODIMENTS

While the present invention has been described with reference to a few specific embodiments, the description is illustrative of the invention and is not to be construed as limiting the invention. Various modifications may occur to those skilled in the art without departing

What is claimed is:

1. A computer system, comprising:
   memory means for storing data and data structures;
   a multiplicity of objects comprising data structures stored in said memory means;
   a multiplicity of processes running concurrently on sid computer system; each of said multiplicity of processes including characteristic denoting means for denoting a set of identifiers; said multiplicity of processes including at least one server process and a plurality of client processes;
   each of a multiplicity of said objects having an associated access control list for limiting access to said each object, each object's access control list including a list of entries, wherein each entry includes a conjunction of one or more identifiers required to access said each object;

access checking means, coupled to said memory means and said multiplicity of processes, for enabling acces by any one of said processes to a specified one of said multiplicity of objects when said set of identifiers in the characteristic denoting means of said one process match the identifiers of one of said entries in said specified object's access control list; and impresonation means, responsive to requests from one of said client processes, for generating an adopted set of identifiers to replace said set of identifiers denoted by the characteristic denoting means of one of said at least one server process, said impersonation means including means for generating said adopted set of identifiers by replacing said one server process' set of identifiers with theunion of said identifiers denoted by the characteristic denoting means of said requesting client process and said identifiers denoted by the characteristic denoting means of said one server process;

said one server process including means, coupled to said access checking means, for performing tasks on behalf of said requesting client process including accessing ones of said multiplicity of objects using the adopted set of identifiers generated by said impersonation means.

2. The computer system set forth in claim 1, further including:

restoration means for storing said set of identifiers of said one server process replaced by said impersonation means, and for restoring said stored set of identifiers to said one server process after said one server process finishes performing said tasks on behalf of said one client process.

3. A computer system, comprising:

memory means for storing data and data structures;

a multiplicity of objects comprising data structures stored in said memory means; each object having an associated access control list for limiting access to said each object, each access control list including a list of entries, wherein each entry includes a conjunction of one or more identifiers required to access said each object;

a multiplicity of process running concurrently on said computer system; each of said multiplicity of processes including characteristic denoting means for denoting a set of identifiers; said multiplicity of processes including a plurality of server processes and a plurality of client processes;

access checking means, coupled to said memory means and said multiplicity of processes, for enabling access by any one of said processes to a specified one of said multiplicity of objects when said set of identifiers in the characteristic denoting means of said one process match the identifiers of one of said entries in said specified object's access control list;

each server process includign means, coupled to said access checking means, for responding to requests from one of said client processes by performing tasks on behalf of said requesting client process, said tasks including accessing ones of said multiplicity of objects; and impersonation means, coupled to said plurality of server processes, for generating an adopted set of identifiers to replace said set of identifiers denoted by the characterstic denoting means of a specified one of said server processes, said impersonation means including means for generating said adopted set of identifiers by replacing said specified one server process' set of identifiers with the union of said identifiers denoted by the characteristic denoting means of said requesting client process and said identifiers denoted by the characteristic denoting means of said specified one server process;

said specified one server process accessing ones of said multiplicity of objects using the adopted set of identifiers generated by said impersonation means.

4. The computer system set forth in claim 3, further including:

restoration means for storing said set of identifiers of said specified one server process replaced by said impersonation means, and for restoring said stored set of identifiers to said specified one server process after said specified one server process finishes performing said tasks on behalf of said requesting client process.

5. In a computer system, having memory means for storing data and data structures;

a multiplicity of objects comprising data structures stored in said memory means; each of a multiplicity of said objects having an associated access control list for limiting access to said each object, each access control list including a list of entries, wherein each entry includes a conjunction of one or more identifiers required to access said each object; and a multiplicity of processes running concurrently on said computer system; said processes including at least one server process and a plurality of client processes; each of said processes having an associated identifier list denoting a set of identifiers;

a method of operating said computer system comprising the steps of:

one of said at least one server process responding to requests by one of said plurality of client processes by performing tasks on behalf of the requesting client process;

said one server process impersonating said requesting client process by adopting a set of identifiers to replace said identifier list associated with said one servier process, wherein said adopted set of identifiers is the union of said identifiers in said identifier list associated with said requesting client process and said identifiers in said identifier list associated with said one server process; and said one server process initiating access to a specified one of said multiplicity of objects, said system enabling access by said one server process to said one specified object when said adopted set of identifiers match the identifiers of at least one entry in said one specified object's access control list.

6. A method of operating a computer system as set forth in claim 5, further including the steps of storing the identifier list of said one server process that was replaced by said adopted set of identifiers, and later restoring said stored identifier list to said one server process after said one server process finishes performing said tasks on behalf of said requesting client process.

7. In a comptuer system, having memory means for storing data and data structures;

a multiplicity of objects comprising data structures stored in said memory means; each of a multiplicity of said objects having an associated access control list for limiting access to said each object, each access control list including a list of entries, wherein eahc entry includes a conjunction of one or more identifiers required to access said each object; and a multiplicity of processes running concurrently on said computer system; said processes including a plurality of server processes and a plurality of client processes; each of said processes having an associated identifier list denoting a set of identifiers;

a method of operating said computer system comprising the steps of:

dach respective server process responding to requests by respective ones of said plurality of client processes by performing tasks on behalf of the respective requesting client process; and each respecitve server process, prior to performing said tasks on behalf of the respective requesting client process, impersonating said respective requesting client process by adopting a set of identifiers to replace said identifier list associated with said respective server process; wherein said set of identifiers adopted by said each respective server process is the union of said identifiers in said identifier list associated with said respective requesting client process and said identifiers in said identifier list associated with said respective server process; and each respective server process initiating access to a respective one of said multiplicity of objects, said system enabling access by said respective server process to said one respective object when said set of identifiers adopted by said respective server process match the identifiers of at least one entry in saidone respective object's access control list.

8. A method of operating a computer system as set forth in claim 7, further including the steps of:

storing the identifier list of said respective server process that was replaced by said adopted set of identifiers, and later restoring said stored identifier list to said respective server process after said respective server process finishes performing said tasks on behalf of said respective requesting client process.

* * * * *

UNITED STATES PATENT AND TRADEMARK OFFICE
CERTIFICATE OF CORRECTION

PATENT NO.   : 5,321,841
DATED        : June 14, 1994
INVENTOR(S)  : Jeffrey A. East et al.

It is certified that error appears in the above-identified patent and that said Letters Patent is hereby corrected as shown below:

Column 4,
Line 10, after "manager 116." begin a new paragraph

Column 11,
Line 14, after "routines." begin a new paragraph

Column 32,
Line 5, delete "2i" and insert therefor -- 21 --

Column 36,
Line 61, delete "sid" and insert therefor -- said --

Column 37,
Line 6, delete "acces" and insert therefor -- access --
Line 20, delete "theunion" and insert therefor -- the union --
Line 47, delete "process" and insert therefor -- processes --
Line 61, delete "includign" and insert therefor -- including --

Column 38,
Line 47, delete "servier" and insert therefor -- server --

Column 39,
Line 6, delete "eahc" and insert therefor -- each --
Line 16, delete "dach" and insert therefor -- each --

UNITED STATES PATENT AND TRADEMARK OFFICE
CERTIFICATE OF CORRECTION

PATENT NO. : 5,321,841
DATED : June 14, 1994
INVENTOR(S) : Jeffrey A. East et al.

It is certified that error appears in the above-identified patent and that said Letters Patent is hereby corrected as shown below:

Column 40,
Line 14, delete "saidone" and insert therefor -- said one --

Signed and Sealed this

Twenty-eighth Day of June, 2005

JON W. DUDAS
*Director of the United States Patent and Trademark Office*